United States Patent
Sarkis et al.

(10) Patent No.: US 11,595,893 B2
(45) Date of Patent: Feb. 28, 2023

(54) COMPRESSION OF GROUP WAKE-UP SIGNAL

(71) Applicant: QUALCOMM Incorporated, San Diego, CA (US)

(72) Inventors: Gabi Sarkis, San Diego, CA (US); Peter Pui Lok Ang, San Diego, CA (US); Huilin Xu, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 16/821,561

(22) Filed: Mar. 17, 2020

(65) Prior Publication Data

US 2020/0314749 A1    Oct. 1, 2020

Related U.S. Application Data

(60) Provisional application No. 62/826,864, filed on Mar. 29, 2019.

(51) Int. Cl.
    *H04W 52/02*    (2009.01)
    *H04L 1/00*     (2006.01)
    (Continued)

(52) U.S. Cl.
    CPC ....... *H04W 52/0219* (2013.01); *H04L 1/0026* (2013.01); *H04L 5/0092* (2013.01);
    (Continued)

(58) Field of Classification Search
    CPC ......... H04W 52/0219; H04W 52/0229; H04W 76/27; H04W 72/042; H04W 24/10;
    (Continued)

(56) References Cited

U.S. PATENT DOCUMENTS

2020/0029302 A1\*  1/2020  Cox ................. H04W 56/0015
2020/0037247 A1\*  1/2020  Liao ................. H04W 52/0216
(Continued)

FOREIGN PATENT DOCUMENTS

WO    WO-2018174635 A1    9/2018

OTHER PUBLICATIONS

3GPP TSG-RAN WG1 Meeting #95; R1-1813186;Source: Ericsson; Spokane, USA, Nov. 12-16, 2018 (Year: 2018).\*
(Continued)

*Primary Examiner* — Mohammed S Chowdhury
(74) *Attorney, Agent, or Firm* — Qualcomm Incorporated

(57) ABSTRACT

Wake-up signal (WUS) downlink control information (DCI) may be configured to convey a wake-up indication as well as UE wake-up behavior configuration information. For example, WUS DCI may include one or more wake-up indications for one or more UEs via wake-up indication bits (e.g., wake-up indication bits may be conveyed in locations of the WUS DCI associated with monitoring indices of the one or more UEs to be activated). For example, WUS DCI may be encoded to include a wake-up indication and an indication of behavior configuration information for a group of one or more UEs. UE wake-up behavior configuration information may indicate some BWP to activate, may trigger a CSI report, etc. A UE may decode the wake-up indication and the wake-up behavior configuration information based on a monitoring index and the WUS configuration.

29 Claims, 22 Drawing Sheets

(51) Int. Cl.
*H04W 76/27* (2018.01)
*H04L 5/00* (2006.01)
*H04W 72/04* (2009.01)

(52) U.S. Cl.
CPC ..... *H04W 52/0229* (2013.01); *H04W 72/042* (2013.01); *H04W 76/27* (2018.02)

(58) Field of Classification Search
CPC .... H04W 48/12; H04W 76/28; H04L 1/0026; H04L 5/0092; H04L 1/1812; H04L 5/0087; H04L 5/001; H04L 5/0057; H04L 5/0064; H04L 5/0091; H04L 5/14; H04L 5/0026; H04L 1/0027; Y02D 30/70
See application file for complete search history.

(56) References Cited

U.S. PATENT DOCUMENTS

| | | | | |
|---|---|---|---|---|
| 2020/0107267 | A1* | 4/2020 | Wu | H04W 52/0229 |
| 2021/0037470 | A1* | 2/2021 | Strom | H04W 52/0235 |
| 2021/0195526 | A1* | 6/2021 | Kim | H04W 24/08 |
| 2021/0204214 | A1* | 7/2021 | Chang | H04W 52/02 |
| 2021/0329550 | A1* | 10/2021 | Åström | H04W 68/02 |
| 2021/0329552 | A1* | 10/2021 | Yang | H04J 13/0022 |
| 2021/0337507 | A1* | 10/2021 | Selvaganapathy | H04W 76/28 |
| 2022/0078708 | A1* | 3/2022 | Yang | H04W 52/0229 |
| 2022/0116875 | A1* | 4/2022 | Nimbalker | H04W 52/0216 |

OTHER PUBLICATIONS

3GPP TSG RAN WG1 Meeting 90bis ;R1-1717279; Source: LG Electronics; Title: Discussion on power saving signal/channel in MTC, Prague, CZ, Oct. 9-13, 2017 (Year: 2017).*
3GPP TSG RAN WG1 Meeting #96; R1-1901572, Source: Huawei, HiSilicon, Title: Power saving schemes, Athens, Greece, Feb. 25-Mar. 1, 2019. (Year: 2019).*
3GPP TSG RAN WG2 Meeting # 102; R2-1807524; Source: Intel Corporation; Title: Open issue in WUS, Busan, Republic of Korea, May 21-25, 2018 (Year: 2018).*
3GPP TSG-RAN WG2 Meeting #103; R2-1811177; Source: MediaTek Inc.; Title: UE Behaviour of WUS Monitoring; Gothenburg, Sweden, Aug. 20 -24, 2018 (Year: 2018).*
3GPP TSG-RAN WG2 Meeting #104; R2-1816956; Source: MediaTek Inc.; Title: UE Group Wake-up Signal in NB-IOT, Spokane, WA, USA, Nov. 12-16, 2018. (Year: 2018).*
3GPP TSG-RAN WG2 #104; Tdoc R2-1818218; Source: Ericsson, Title: General aspects of group WUS, Spokane, USA, Nov. 12-16, 2018. (Year: 2018).*
ERICSSON: "Detection Performance and Correlation Analysis of PDCCH-Based Wakeup", 3GPP Draft, R1-1813186, Detection Performance and Correlation Analysis of PDCCH-Based Wakeup Signal, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555179, 10 pages, Retrieved from the Internet: URL: http://www.3gpp.org/ftp/Meetings%5F3GPP%5FSYNC/RAN1/Docs/R1%2D1813186%2Ezip. [retrieved on Nov. 11, 2018] Section 2.1.2.
Huawei, et al., "PowerSaving Schemes", 3GPP Draft, R1-1901572, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599269, 20 pages, Retrieved from the Internet: URL: http://www.3gpp.org/ftp/tsg%5Fran/WG1%5FRL1 /TSGR1%5F96/Docs/R1%2D1901572%2Ezip. [retrieved on Feb. 16, 2019] Section 2 .1. 1.5.
International Search Report and Written Opinion—PCT/US2020/023326—ISA/EPO—dated Jul. 7, 2020.

* cited by examiner

COMPRESSION OF GROUP WAKE-UP SIGNAL

CROSS REFERENCE

The present application for patent claims the benefit of U.S. Provisional Patent Application No. 62/826,864 by SARKIS et al., entitled "COMPRESSION OF GROUP WAKE-UP SIGNAL," filed Mar. 29, 2019, assigned to the assignee hereof, and expressly incorporated by reference herein.

BACKGROUND

The following relates generally to wireless communications, and more specifically to compression of group wake-up signal (WUS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications system, a base station and a UE may utilize a power saving signal, such as a WUS, for idle mode paging. For example, the UE may wake from a sleep state upon receiving the WUS and monitor for downlink transmissions (such as a paging message, a synchronization signal block (SSB)) from the base station. In some cases, a base station may utilize a group WUS, to wake-up one or more UEs (e.g., rather than transmit one or more UE-specific WUSs). In such cases, a UE may receive the group WUS, and may determine whether or not to wake from a sleep state (e.g., based on whether or not the UE is included in the wake-up group indicated via the group WUS).

SUMMARY

The described techniques relate to improved methods, systems, devices, or apparatuses that support compression of group WUS. In some cases, a base station may use a WUS during idle-mode paging to indicate if a UE is to wake (e.g., from a sleep state) to decode a particular downlink channel, activate an SSB, monitor a channel state information reference signal (CSI-RS) and transmit a channel state information (CSI) report, etc. For example, utilization of the WUS may serve to optimize power consumption at the UE (e.g., as a UE may, in some cases, conserve power by operating in an idle more, a sleep state, a low power mode, a discontinuous reception (DRX) mode, etc.). In some examples, a base station may use a group WUS to indicate if one or more (e.g., a group) of UEs is to wake-up.

WUS downlink control information (DCI) may be configured to convey a wake-up indication as well as UE wake-up behavior configuration information. For example, WUS DCI may include one or more wake-up indications for one or more UEs via wake-up indication bits (e.g., wake-up indication bits may be conveyed in locations of the WUS DCI associated with monitoring indices of the one or more UEs to be activated). In some cases, WUS DCI may implicitly indicate all receiving UEs to wake-up and may convey UE wake-up behavior information. In yet other cases, WUS DCI may include a single bit to indicate whether all receiving UEs are to wake-up, as well as additional information conveying UE wake-up behavior. Various configurations of WUS DCI for indication of UE wake-up behavior are described herein. A UE may identify a WUS configuration (e.g., a configuration of WUS DCI), and may decode the WUS DCI according to the WUS configuration and, in some cases, a monitoring index. For example, WUS DCI may be encoded to include a wake-up indication and an indication of behavior configuration information for a group of one or more UEs. A UE may decode the wake-up indication and the wake-up behavior configuration information based on a monitoring index and the WUS configuration.

In some examples, UE wake-up behavior configuration information may indicate some bandwidth part (BWP) to activate, may trigger a CSI report, etc. A UE may receive and decode a group WUS and, if the location of the group WUS monitored by the UE includes a wake-up indication, the UE may adhere to any additional configuration information included for the UE. For example, in some cases, WUS DCI (e.g., including a CSI trigger for one or more UEs) may configure a UE to wake-up, receive some CSI-RS, and transmit a CSI report. Additionally or alternatively, WUS DCI (e.g., including a BWP indication for one or more UEs) may configure a UE to wake-up and activate some BWP. In some cases, WUS DCI may indicate such additional information by including explicit fields conveying UE wake-up behavior information. In some cases, WUS DCI may indicate such additional information by conveying look-up table (LUT) information (e.g., a network may specify that WUS DCI is configured to indicate LUT indications for certain UE wake-up behaviors at certain locations of the WUS DCI). In some examples, a base station may radio resource control (RRC) configure some UE wake-up behavior, and the WUS DCI may trigger the RRC configured UE wake-up behavior.

A method of wireless communication at a UE is described. The method may include identifying a WUS configuration, where the WUS configuration includes at least a monitoring index associated with a WUS and an information format associated with the WUS, receiving the WUS, decoding the received WUS based on the identified WUS configuration, where the WUS includes a wake-up indication and an indication of behavior configuration information, and determining whether the UE is part of a wake-up group associated with the wake-up signal based at least in part on decoding the received wake-up signal.

An apparatus for wireless communication at a UE is described. The apparatus may include a processor, memory in electronic communication with the processor, and instructions stored in the memory. The instructions may be executable by the processor to cause the apparatus to identify a WUS configuration, where the WUS configuration includes at least a monitoring index associated with a WUS and an information format associated with the WUS, receive the WUS, decode the received WUS based on the identified WUS configuration, where the WUS includes a wake-up indication and an indication of behavior configuration information, and determine whether the UE is part of a wake-up group associated with the wake-up signal based at least in part on decoding the received wake-up signal.

Another apparatus for wireless communication at a UE is described. The apparatus may include means for identifying a WUS configuration, where the WUS configuration includes at least a monitoring index associated with a WUS and an information format associated with the WUS, receiving the WUS, decoding the received WUS based on the identified WUS configuration, where the WUS includes a wake-up indication and an indication of behavior configuration information, and determining whether the UE is part of a wake-up group associated with the wake-up signal based at least in part on decoding the received wake-up signal.

A non-transitory computer-readable medium storing code for wireless communication at a UE is described. The code may include instructions executable by a processor to identify a WUS configuration, where the WUS configuration includes at least a monitoring index associated with a WUS and an information format associated with the WUS, receive the WUS, decode the received WUS based on the identified WUS configuration, where the WUS includes a wake-up indication and an indication of behavior configuration information, and determining whether the UE is part of a wake-up group associated with the wake-up signal based at least in part on decoding the received wake-up signal.

Some examples of the method, apparatuses, and non-transitory computer-readable medium described herein may further include operations, features, means, or instructions for identifying one or more UE behavior configuration information fields of the WUS based on the monitoring index and a UE identifier, and decoding the identified one or more UE behavior configuration information fields. In some examples of the method, apparatuses, and non-transitory computer-readable medium described herein, the UE identifier may include a radio network temporary identifier (RNTI). Some examples of the method, apparatuses, and non-transitory computer-readable medium described herein may further include operations, features, means, or instructions for identifying one or both of a CSI report trigger and an indication of a BWP based on decoding the identified one or more UE behavior configuration information fields.

Some examples of the method, apparatuses, and non-transitory computer-readable medium described herein may further include operations, features, means, or instructions for transmitting a CSI report based on one or more of the CSI report trigger, a default CSI report, and RRC signaling. Some examples of the method, apparatuses, and non-transitory computer-readable medium described herein may further include operations, features, means, or instructions for activating the BWP based on one or more of the indication of the BWP, a last BWP used in a last on-duration, a default BWP, and a RRC configured BWP.

Some examples of the method, apparatuses, and non-transitory computer-readable medium described herein may further include operations, features, means, or instructions for identifying a mask for comparison with the wake-up indication, and comparing the identified mask with a bit sequence of the wake-up indication, where the identification of the wake-up group may be based on the comparison. In some examples of the method, apparatuses, and non-transitory computer-readable medium described herein, the mask may be identified based on one or both of RRC signaling and a UE identifier. In some examples of the method, apparatuses, and non-transitory computer-readable medium described herein, the wake-up indication includes an indication for all UEs to wake-up.

Some examples of the method, apparatuses, and non-transitory computer-readable medium described herein may further include operations, features, means, or instructions for identifying behavior configuration information based on a value of the wake-up indication and a value of a bit corresponding to the monitoring index. In some examples of the method, apparatuses, and non-transitory computer-readable medium described herein, a presence of the behavior configuration information in the WUS may be based on the value of the wake-up indication and the value of the bit corresponding to the monitoring index. In some examples of the method, apparatuses, and non-transitory computer-readable medium described herein, a location of the indication of behavior configuration information may be based on the value of the wake-up indication and the value of a bit corresponding to the monitoring index.

In some examples of the method, apparatuses, and non-transitory computer-readable medium described herein, the behavior configuration information may be identified based on one or more of RRC signaling, a default behavior configuration information, and a previous behavior configuration information from a last on-duration. In some examples of the method, apparatuses, and non-transitory computer-readable medium described herein, the indication of behavior configuration information includes the wake-up indication and a bit corresponding to the monitoring index. In some examples of the method, apparatuses, and non-transitory computer-readable medium described herein, the wake-up indication includes two or more bits corresponding to the monitoring index.

Some examples of the method, apparatuses, and non-transitory computer-readable medium described herein may further include operations, features, means, or instructions for determining that no transmissions or receptions may be to be scheduled based on a value of each of the two or more bits corresponding to the monitoring index. Some examples of the method, apparatuses, and non-transitory computer-readable medium described herein may further include operations, features, means, or instructions for identifying behavior configuration information based on a value of each of the two or more bits corresponding to the monitoring index.

In some examples of the method, apparatuses, and non-transitory computer-readable medium described herein, the behavior configuration information may be identified based on one or more of RRC signaling, a default behavior configuration information, and a previous behavior configuration information from a last on-duration. Some examples of the method, apparatuses, and non-transitory computer-readable medium described herein may further include operations, features, means, or instructions for determining to wake-up based on receiving the WUS. In some examples of the method, apparatuses, and non-transitory computer-readable medium described herein, one or more bits corresponding to the monitoring index associated with the WUS indicate behavior configuration information.

In some examples of the method, apparatuses, and non-transitory computer-readable medium described herein, the monitoring index associated with the WUS includes one or more indices, each index of the one or more indices corresponding to a cell configured for the UE. In some examples of the method, apparatuses, and non-transitory computer-readable medium described herein, one or both of a presence of behavior configuration information in the WUS and a location of behavior configuration information in the WUS may be based on a value of a bit corresponding to the monitoring index. Some examples of the method, apparatuses, and non-transitory computer-readable medium described herein may further include operations, features, means, or instructions for determining whether the UE may be part of the wake-up group based on the identified wake-up group.

Some examples of the method, apparatuses, and non-transitory computer-readable medium described herein may further include operations, features, means, or instructions for receiving the WUS in DCI. Some examples of the method, apparatuses, and non-transitory computer-readable medium described herein may further include operations, features, means, or instructions for receiving an indication of the monitoring index via RRC signaling and monitoring a location in DCI of the WUS based on the monitoring index. Some examples of the method, apparatuses, and non-transitory computer-readable medium described herein may further include operations, features, means, or instructions for identifying a wake-up indication based on monitoring the location.

A method of wireless communication at a base station is described. The method may include identifying a WUS configuration, where the WUS configuration includes a monitoring index associated with a WUS and an information format associated with the WUS, determining whether a UE is part of a wake-up group, determining a wake-up indication and an indication of behavior configuration information based on the determination of whether the UE is part of the wake-up group and the information format associated with the WUS, encoding the WUS based on the identified WUS configuration, and transmitting the encoded WUS, where the encoded WUS includes the determined wake-up indication and the determined indication of behavior configuration information.

An apparatus for wireless communication at a base station is described. The apparatus may include a processor, memory in electronic communication with the processor, and instructions stored in the memory. The instructions may be executable by the processor to cause the apparatus to identify a WUS configuration, where the WUS configuration includes a monitoring index associated with a WUS and an information format associated with the WUS, determine whether a UE is part of a wake-up group, determine a wake-up indication and an indication of behavior configuration information based on the determination of whether the UE is part of the wake-up group and the information format associated with the WUS, encode the WUS based on the identified WUS configuration, and transmit the encoded WUS, where the encoded WUS includes the determined wake-up indication and the determined indication of behavior configuration information.

Another apparatus for wireless communication at a base station is described. The apparatus may include means for identifying a WUS configuration, where the WUS configuration includes a monitoring index associated with a WUS and an information format associated with the WUS, determining whether a UE is part of a wake-up group, determining a wake-up indication and an indication of behavior configuration information based on the determination of whether the UE is part of the wake-up group and the information format associated with the WUS, encoding the WUS based on the identified WUS configuration, and transmitting the encoded WUS, where the encoded WUS includes the determined wake-up indication and the determined indication of behavior configuration information.

A non-transitory computer-readable medium storing code for wireless communication at a base station is described. The code may include instructions executable by a processor to identify a WUS configuration, where the WUS configuration includes a monitoring index associated with a WUS and an information format associated with the WUS, determine whether a UE is part of a wake-up group, determine a wake-up indication and an indication of behavior configuration information based on the determination of whether the UE is part of the wake-up group and the information format associated with the WUS, encode the WUS based on the identified WUS configuration, and transmit the encoded WUS, where the encoded WUS includes the determined wake-up indication and the determined indication of behavior configuration information.

Some examples of the method, apparatuses, and non-transitory computer-readable medium described herein may further include operations, features, means, or instructions for identifying one or both of a CSI report trigger and an indication of a BWP, where the indication of behavior configuration information may be determined based on the identification of one or both of the CSI report trigger and the indication of the BWP. Some examples of the method, apparatuses, and non-transitory computer-readable medium described herein may further include operations, features, means, or instructions for receiving a CSI report based on one or both of the CSI report trigger and a default CSI report. Some examples of the method, apparatuses, and non-transitory computer-readable medium described herein may further include operations, features, means, or instructions for transmitting RRC signaling configuring a type of CSI report, and receiving a CSI report based on one or both of the CSI report trigger and the type of CSI report.

Some examples of the method, apparatuses, and non-transitory computer-readable medium described herein may further include operations, features, means, or instructions for transmitting the BWP based on one or more of the indication of the BWP, a last BWP used in a last on-duration, and a default BWP. Some examples of the method, apparatuses, and non-transitory computer-readable medium described herein may further include operations, features, means, or instructions for transmitting RRC signaling configuring the BWP, and transmitting the BWP based on one or both of the indication of the BWP and the configured BWP.

Some examples of the method, apparatuses, and non-transitory computer-readable medium described herein may further include operations, features, means, or instructions for determining one or more UEs that may be part of the wake-up group, identifying a UE mask, for UE comparison with the wake-up indication, of each of the determined one or more UEs that may be part of the wake-up group, and determining a bit sequence of the wake-up indication based on the identified UE mask of each of the determined one or more UEs that may be part of the wake-up group. In some examples of the method, apparatuses, and non-transitory computer-readable medium described herein, the mask of each of the determined one or more UEs may be identified based on one or both of RRC signaling and a UE identifier.

In some examples of the method, apparatuses, and non-transitory computer-readable medium described herein, the wake-up indication includes an indication for all UEs to wake-up. In some examples of the method, apparatuses, and non-transitory computer-readable medium described herein, the indication of behavior configuration information may be based on a value of the wake-up indication and a value of a bit corresponding to the monitoring index. In some examples of the method, apparatuses, and non-transitory computer-readable medium described herein, a presence of the behavior configuration information in the WUS may be based on the value of the wake-up indication and the value of the bit corresponding to the monitoring index.

In some examples of the method, apparatuses, and non-transitory computer-readable medium described herein, a location of the indication of behavior configuration information may be based on the value of the wake-up indication and the value of a bit corresponding to the monitoring index. In some examples of the method, apparatuses, and non-transitory computer-readable medium described herein, the indication of behavior configuration information may be identified based on one or more of RRC signaling, a default behavior configuration information, and a previous behavior configuration information from a last on-duration.

In some examples of the method, apparatuses, and non-transitory computer-readable medium described herein, the indication of behavior configuration information includes the wake-up indication and a bit corresponding to the monitoring index. In some examples of the method, apparatuses, and non-transitory computer-readable medium described herein, the wake-up indication includes two or more bits corresponding to the monitoring index. In some examples of the method, apparatuses, and non-transitory computer-readable medium described herein, the monitoring index associated with the WUS includes one or more indices, each index of the one or more indices corresponding to a cell configured for the UE.

In some examples of the method, apparatuses, and non-transitory computer-readable medium described herein, one or both of a presence of behavior configuration information in the WUS and a location of behavior configuration information in the WUS may be based on a value of a bit corresponding to the monitoring index. Some examples of the method, apparatuses, and non-transitory computer-readable medium described herein may further include operations, features, means, or instructions for determining a group of wake-up indications for a set of UEs, and determining a group of indications of behavior configuration information for the set of UEs, where the WUS is encoded based at least in part on the group of wake-up indications preceding the group of indications of behavior configuration information.

DETAILED DESCRIPTION

Figure 1:
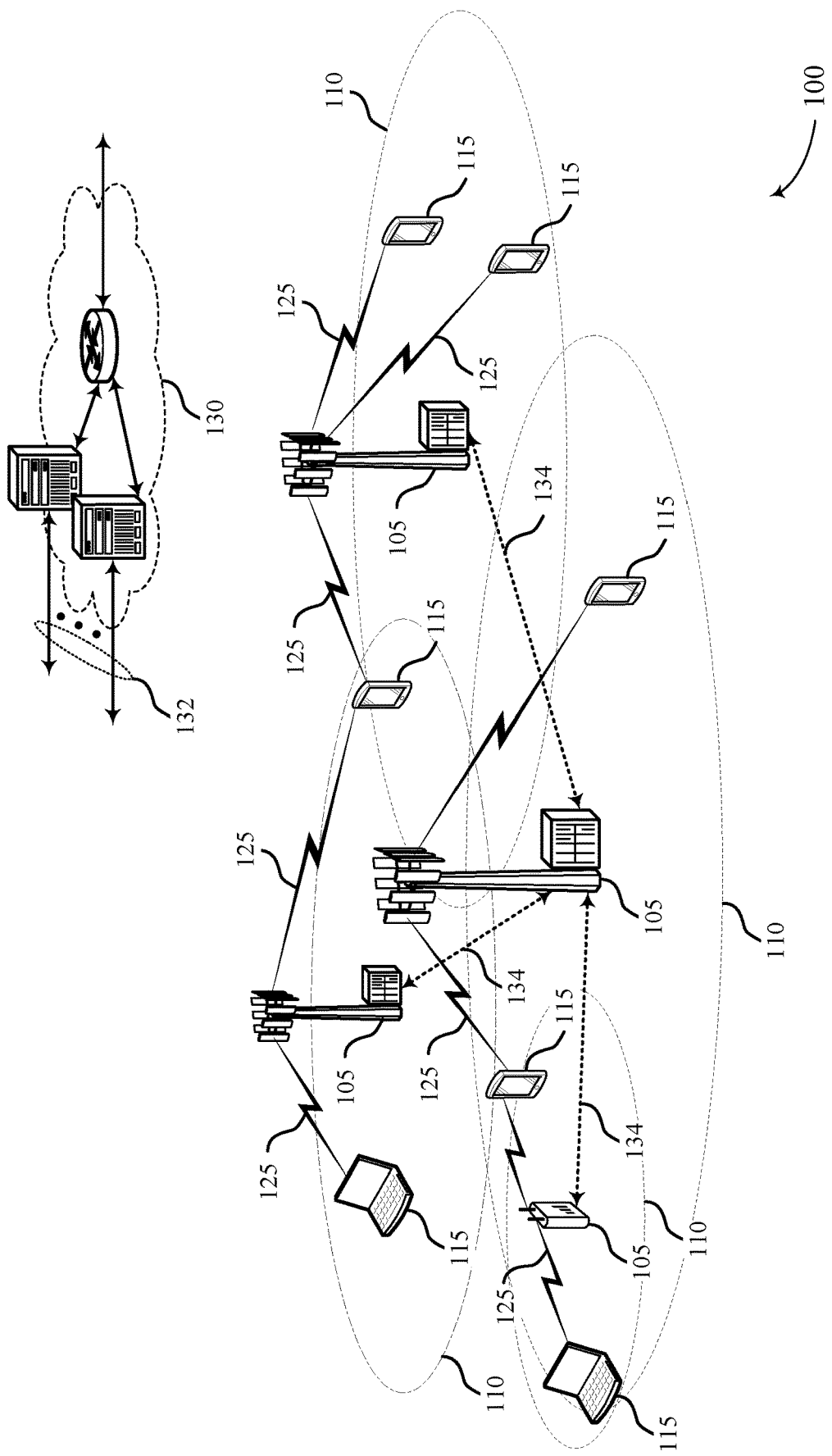
FIG. 1 illustrates an example of a system for wireless communications that supports compression of group WUS in accordance with aspects of the present disclosure.

Some wireless communications systems (e.g., millimeter wave (mmW) systems) may support UEs operating in a low power state (e.g., an idle mode, a sleep state, a DRX mode, etc.). In some cases, a base station may use physical downlink control channel (PDCCH)-based WUSs. A UE may receive a PDCCH-based WUS and may switch from the low power state to an active state for data transmission and reception. For example, a base station may transmit a WUS when the base station has data prepared to transmit to the UE, when the base station is scheduling the UE for data transmission, etc. Thus, WUSs may enable the UE to reduce unnecessary wake-up occasions (e.g., when no data transmissions are scheduled during a duration, such as an ON duration, associated with an active state), which may result in improved power savings at the UE. In some cases, the DCI associated with the PDCCH-based WUS may be scrambled using a UE-specific identifier. Thus, the base station may scramble the DCI uniquely for each UE using UE-specific identifiers. In wireless communications systems where a base station serves a large number of UEs, such a technique for transmitting WUSs may unnecessarily increase the use of PDCCH resources at the base station (e.g., as the number of UEs the base station serves increases, the DCI size may undesirably increase).

According to one or more aspects of the present disclosure, a base station may use a group WUS to wake a group of UEs (e.g., a group of one or more UEs) in order to resourcefully use WUSs. Further, the described techniques may provide for compression of group wake-up signaling, and DCI may include UE group wake-up indication as well as additional fields indicating UE wake-up behavior. That is, DCI may include UE group wake-up indication in addition to UE wake-up behavior configuration. The DCI configurations described herein may provide for efficient signaling of such information. As such, in wireless communications systems where a base station serves a large number of UEs, a base station may utilize these techniques to efficiently wake-up a group of UEs and configure additional information (e.g., UE wake-up behavior).

For example, a UE may receive a group WUS (e.g., DCI) and may decode the group WUS based on a monitoring index (e.g., a UE may monitor locations of the WUS corresponding to some monitoring index of the UE). In some cases, the WUS monitoring index may be configured by the base station, for example, using RRC signaling. In other cases, the WUS monitoring index may be derived (e.g., from some preconfigured or specified LUT) based on a UE identifier (e.g., such as a cell radio network temporary identifier (C-RNTI)). As such, a base station may selectively convey wake-up indication and UE wake-up behavior configuration information by encoding the group WUS using knowledge of various UE monitoring indices. For example, a base station may identify one or more UEs to be activated (e.g., woken up, powered for transmission and reception, etc.), identify monitoring indices associated with the one or more UEs, and set locations of the group WUS corresponding to the identified monitoring indices to signal a wake-up indication. Further, the base station may identify wake-up behavior configuration information for the one or more UEs to be activated and encode the group WUS such that the locations of the WUS that each UE to be activated will monitor appropriately conveys the desired wake-up behavior configuration information for the monitoring UE.

Generally, the additional information included in the group WUS may include any UE configuration information. For example, UE wake-up behavior configuration information may indicate some BWP to activate, may trigger a CSI report, etc. A UE may receive and decode a group WUS and, if the location of the group WUS (e.g., the location in the DCI) monitored by the UE includes a wake-up indication, the UE may adhere to any additional configuration information included for the UE. For example, in some cases, a WUS (e.g., including a CSI trigger for one or more UEs) may configure a UE to wake-up, receive some CSI-RS, and transmit a CSI report. Additionally or alternatively, a WUS (e.g., including a BWP indication for one or more UEs) may configure a UE to wake-up and activate some BWP. In some cases, a WUS (e.g., DCI) may indicate such additional information by including explicit fields conveying such UE wake-up behavior information. In some cases, a WUS (e.g., DCI) may indicate such additional information by conveying one or more LUT indications (e.g., a network may specify that WUSs or DCI are configured to indicate LUT indications for certain UE wake-up behaviors at certain locations of the signal).

The described techniques may provide for resource efficiency for base stations conveying such information, and therefore may benefit base stations and systems by reducing overhead signaling. Additionally, the described WUS configurations may provide power efficiencies to UEs, and therefore may benefit the UEs with improved power savings. As discussed herein, WUSs (e.g., WUS DCI) may indicate such information using various techniques (e.g., WUS DCI may be configured in various ways to efficiently convey wake-up indication and UE wake-up behavior configuration information to one or more UEs).

Aspects of the disclosure are initially described in the context of a wireless communications system. Aspects of the disclosure are further illustrated by and described with reference to example DCI configurations, apparatus diagrams, system diagrams, and flowcharts that relate to compression of group WUS.

FIG. 1 illustrates an example of a wireless communications system 100 that supports compression of group WUS in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems 100 (e.g., mmW systems) may support UEs 115 operating in a low power state (e.g., an idle mode, a sleep state, a DRX mode, etc.). For example, in a DRX mode, a UE 115 may switch between an active state for data transmission and reception and a sleep state for power saving. The UE 115 may determine if data is available by monitoring a control channel, such as a PDCCH. The PDCCH may carry or otherwise convey (e.g., via a WUS, DCI, etc.) an indication that a base station 105 has data prepared to transmit to the UE 115, that the base station 105 is scheduling the UE 115 for data transmission, that the UE 115 is to transmit a CSI report, etc. In some examples, a base station 105 may use a WUS to convey an indication that the base station 105 has data ready to transmit to the UEs 115, the base station 105 is scheduling the UE 115 for data transmission, that the UE 115 is to transmit a CSI report, etc. Examples of a WUS may be a reference signal-type signal, such as a CSI-RS, or a tracking reference signal (TRS), or a demodulation reference signal (DMRS), or a synchronization signal, or the like. In other examples, examples of WUSs may be PDDCH-type signals. In some examples, a WUS may be scrambled according to a scrambling sequence, such as a pseudo-noise (PN) sequence, a Zadoff-Chu (ZC) sequence, or a Gold sequence, etc. In some examples, the base stations 105 may transmit a PDCCH-based WUS in or with a DCI.

To reduce the frequency of control channel monitoring and improve power efficiency of the UE 115 during DRX operation, the UE 115 may monitor a WUS while in a low power mode. For example, if the UE 115 receives (or detects) a WUS transmitted by the base station 105, the UE 115 may transition to a higher power mode (e.g., to monitor the control channel for scheduling information). Thus, WUSs may enable the UE 115 to reduce unnecessary wake-up occasions (e.g., when no data transmissions are scheduled during a duration, such as an ON duration, associated with an active state), which may improve power savings at the UE 115. In conventional systems, a UE 115 may receive a PDCCH-based WUS with the DCI scrambled using a C-RNTI. Upon receiving the PDCCH-based WUS, the UE 115 may identify the PDCCH-based WUS by determining that a CRC in the DCI is scrambled using the C-RNTI. A C-RNTI may be uniquely associated with a UE 115. However, in wireless communications systems where a base station 105 serves a large number of UEs 115, the base station 105 may have to transmit a PDCCH-based WUS for each UE 115. This may unnecessarily increase the use of PDCCH resources at the base station 105 and thus more efficient WUS transmission techniques may be desired.

In order to resourcefully use WUSs, the base station 105 may use a group WUS to wake a group of UEs 115 (e.g., a group of one or more UEs). Further, the described techniques may provide for compression of group wake-up signaling, such that a WUS DCI may include UE group wake-up indication as well as additional fields indicating UE 115 wake-up behavior. That is, DCI may include UE group wake-up indication in addition to UE 115 wake-up behavior configuration. The DCI configurations described herein may provide for efficient signaling of such information. As such, in wireless communications systems where a base station serves a large number of UEs (e.g., such as wireless communications system 100), a base station 105 may utilize these techniques to efficiently wake-up a group of UEs 115 and configure additional information (e.g., wake-up behavior of one or more UEs 115).

For example, a UE 115 may receive a group WUS (e.g., DCI) and may decode the group WUS based on a monitoring index (e.g., a UE may monitor locations of the WUS corresponding to some monitoring index of the UE). In some cases, the WUS monitoring index may be configured by the base station 105 (e.g., via RRC signaling from the base station 105). In other cases, the WUS monitoring index may be derived (e.g., from some preconfigured or specified LUT) based on a UE identifier (e.g., such as a C-RNTI). In some cases, a UE identifier (e.g., C-RNTI) may be configured by a base station 105 (e.g., via RRC signaling) and the UE 115 and base station 105 may thus both be aware of the WUS monitoring index the UE 115 derives. As such, a base station 105 may selectively convey wake-up indication and wake-up behavior configuration information for certain UEs 115 by encoding the group WUS using knowledge of various UE monitoring indices. For example, a base station 105 may identify one or more UEs 115 to be activated (e.g., woken up, powered for transmission and reception, etc.), identify monitoring indices associated with the one or more UEs 115, and set locations of the group WUS corresponding to the identified monitoring indices to signal a wake-up indication. Further, the base station 105 may identify wake-up behavior configuration information for the one or more UEs to be activated and encode the group WUS such that the locations of the WUS that each UE 115 to be activated will monitor appropriately conveys the desired wake-up behavior configuration information for the monitoring UE 115.

Generally, the additional information included in the group WUS may include any configuration information for a UE 115. For example, UE wake-up behavior configuration information may indicate some BWP to activate, may trigger a CSI report, etc. A UE 115 may receive and decode a group WUS and, if the location of the group WUS monitored by the UE 115 (e.g., decoded by the UE 115 based on the monitoring index) includes a wake-up indication, the UE 115 may adhere to any additional configuration information included for the UE. For example, in some cases, a WUS (e.g., including a CSI trigger for one or more UEs) may configure a UE 115 to wake-up, receive some CSI-RS, and transmit a CSI report. Additionally or alternatively, a WUS (e.g., including a BWP indication for one or more UEs 115) may configure a UE 115 to wake-up and activate some BWP. In some cases, a WUS (e.g., DCI) may indicate such additional information by including explicit fields conveying such UE wake-up behavior information. In some cases, a WUS (e.g., DCI) may indicate such additional information by conveying one or more LUT indications (e.g., a network may specify that WUSs or DCI are configured to indicate LUT indications for certain UE wake-up behaviors at certain locations of the signal).

In some examples, each UE 115 or a group of UEs 115 may be configured with monitoring index based in part on a configuration message (such as an RRC configuration). In some examples, each UE 115 may derive a monitoring index based on, for example, a UE identifier. In some examples, all UEs 115 (e.g., of all UEs 115 in some group) may monitor a single location ($W_{all}$) for a wake-up indication. In some examples, UEs 115 may not necessarily be configured with a WUS monitoring index (e.g., WUS DCI may not include an explicit wake-up indication for different UEs 115 or for different groups of UEs 115), and a UE 115 that receives the WUS DCI may treat the WUS DCI as a wake-up indication upon reception.

In some cases, WUS monitoring indices and UE wake-up behavior information (e.g., CSI triggers, BWPs to activate, etc.) may be configured via RRC signaling. For example, UE wake-up behavior information may be configured via RRC signaling, and may be triggered via additional information (e.g., UE wake-up behavior configuration information) included in WUSs or DCI. That is, a base station 105 may RRC configure some CSI trigger or BWP to activate, and may indicate whether the CSI trigger or BWP to activate is to be adhered to by a UE to be activated via the additional information included in the WUS DCI. In other cases, a network may configure or specify some default UE wake-up behavior information (e.g., a default CSI triggers, a default BWP to activate, etc.) and a base station 105 may indicate whether the default CSI trigger or default BWP to activate is to be adhered via the additional information included in the WUS DCI. In some examples, the configuration messages (e.g., RRC signaling from a base station 105) may be specific to each UE 115 or may be common for a group of UEs 115 (e.g., each UE may be configured with a monitoring index or some UE wake-up behavior information, or a group of UEs may be configured with a same monitoring index or some same UE wake-up behavior information).

In some examples, in addition to a multi-UE wake-up indication, the WUS DCI may include fields applicable to all UEs that have been indicated to wake-up. For example, one field may be an aperiodic CSI (A-CSI) trigger applicable to all UEs. CSI-RS scheduling may be in DCI and applicable to all UEs, RRC configured, or specified by the network (e.g., at the beginning of the DRX on-duration). In some cases, an A-CSI trigger may include a configuration index, such that the UE may know which report is triggered. Alternatively, the network may specify some default CSI report, some CSI report for wake-up UEs only, etc. In some cases, a CSI report may be RRC configured, and when the WUS DCI includes an A-CSI trigger, the wake-up UE may refer to the RRC configured CSI report configuration. In some examples, one field may indicate or configure the UEs to switch to a BWP upon wake-up (e.g., to activate a BWP based on an explicit BWP ID, the BWP used in the last on-duration, a default BWP, an RRC-indicated BWP, etc.). In some cases, UE wake-up behavior may be RRC configured, and additional information fields of WUS DCI may trigger one or more behaviors that have been RRC configured.

Figure 2:
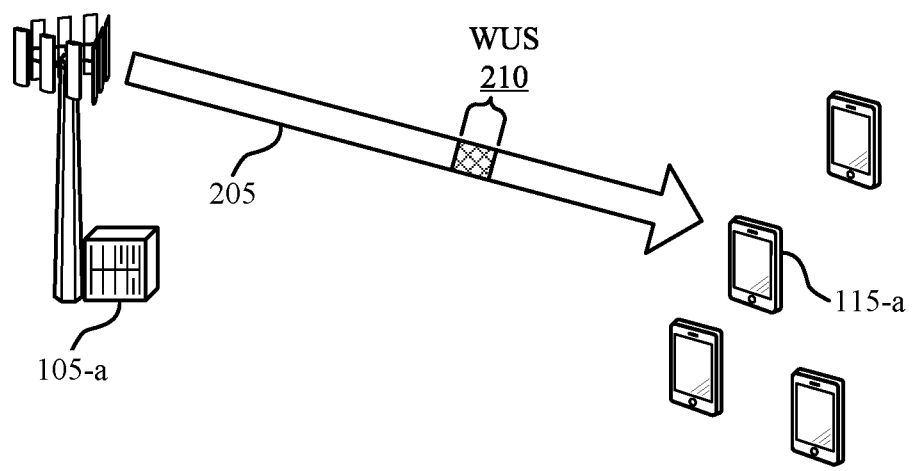
FIG. 2 illustrates an example of a wireless communications system that supports compression of group WUS in accordance with aspects of the present disclosure.

FIG. 2 illustrates an example of a wireless communications system 200 that supports compression of group WUS in accordance with aspects of the present disclosure. In some examples, wireless communications system 200 may implement aspects of wireless communications system 100. Wireless communications system 200 may include base station 105-a and UE 115-a, which may be examples of the corresponding devices described with reference to FIG. 1. Base station 105-a and UE 115-a may be in communication with each other over a communication link (e.g., such as a communication link 125). In some cases, wireless communications system 200 may operate in mmW spectrum, may support radio technologies such as NB-IoT or eMTC, etc. Some examples of the wireless communications system 200 may support an improved wake-up signaling procedures, such as WUS UE wake-up behavior configuration and group WUS compression techniques described herein.

In some cases, base station 105-a may use a power saving physical signal (e.g., WUS 210) to wake-up a UE 115-a (e.g., to indicate UE 115-a should transition from a low power state to an active state, to indicate UE 115-a should decode a subsequent downlink physical channel (e.g., PDCCH or PDSCH) in idle mode paging, to indicate UE 115-a should wake-up to activate a BWP, to trigger a CSI report from UE 115-a, etc.). In some cases, WUS 210 may serve to optimize power consumption at UE 115-a, for example, where UE 115-a may rely on receipt of WUS 210 before waking from a sleep state. In some cases, base station 105-a may introduce a periodic synchronization signals (e.g., a primary synchronization signal (PSS) or a secondary synchronization signal (SSS)) in combination with WUS 210 to ensure sufficient synchronization performance. In other cases, base station 105-a may not introduce periodic synchronization signals in a WUS mode.

In some cases, UE 115-a may be capable of and configured to detect WUS 210 (e.g., based on a WUS periodicity configured by higher layers). Thus, if UE 115-a is configured to detect WUS 210 for power saving, UE 115-a may not read a downlink channel, such as PDCCH or PDSCH, if WUS 210 is not detected (e.g., or if a group WUS does not include a wake-up indication for the UE 115-a). The wake-up procedure may include switching to an active mode to monitor a control channel, to measure a CSI-RS and transmit a CSI report, to activate a BWP, etc., subsequent to initiating the wake-up procedure. For example, subsequently, the UE 115-a may receive, within the control channel, a grant from the base station 105-a and communicate with the base station 105-a based in part on the grant. In some examples, if the UE 115-a does not detect or otherwise receive a WUS, the UE 115-a may skip a DRX ON duration and instead may return to the lower power mode (e.g., go back to sleep). In this way, the UE 115-a may reduce its power consumption by not entering an active mode (e.g., such as a DRX ON duration) when there is no data scheduled for reception or transmission.

In conventional wireless communications system, a DRX mode of operation may span the time period between consecutive "ON" states. A UE 115-a may determine if data is available by monitoring a control channel, such as a PDCCH. The PDCCH may carry or otherwise convey an indication that a base station 105-a has data ready to transmit to the UE 115-a. A base stations 105-a may use a WUS to convey an indication that the base station 105-a is scheduling the UE 115-a for data transmission. For example, a UE 115-a may operate in a low power mode until signaled, via a WUS 210, to transition into a higher power mode to support data transmission and reception. The base station 105-a may provide a network coverage for UEs 115 within a geographic coverage area. In some examples, UEs 115 may support DRX operation with WUSs 210 for improved power efficiency. In some cases, these WUSs 210 may be examples of reference signal-type signals or PDCCH-type signals.

In the wireless communications system 200 (e.g., a mmW system supporting beamforming), the base station 105-a may transmit WUSs 210. For example, the base station 105-a may transmit WUSs 210 on a downlink channel 205 (e.g., a downlink control channel). In some examples, the base station 105-a may transmit the WUSs 210 using a number of different downlink transmit beams (not shown). The base station 105-a may transmit the wake-up signaling to improve the reception reliability at the UEs 115. If the UEs 115 successfully receives one or more of the WUSs 210 transmitted by the base station 105-a, the UEs 115 may perform a wake-up procedure and transition to a higher power level (e.g., an active state) to support data transmission and reception. In one example, the UEs 115 may attempt to receive the WUSs 210 using a number of downlink receive beams (not shown).

In some examples, each WUS 210 may either be a UE-specific WUS 210 or a group-specific WUS 210 (e.g., a group WUS). In the example of FIG. 2, the base station 105-a may serve the UE 115-a. In some instances, the base station 105-a may transmit a UE-specific WUS 210 to initiate a wake-up procedure at one particular UE 115-a. In some cases, the base station 105-a may configure each UE 115 with a UE-specific RNTI (such as a C-RNTI). That is, each UE 115 may have a dedicated WUS 210, where the DCI of the dedicated WUS 210 is scrambled using the UE-specific RNTI (such as the C-RNTI). This may result in a large network overhead (e.g., for the base station 105-a to transmit individual WUSs 210 for each UE 115 scheduled to wake-up) but highly flexible wake-up signaling. That is, in wireless communications systems (such as wireless communications system 200) where a base station 105-a serves a large number of UEs 115, the base station 105-a may have to transmit a WUS 210 for each UE 115. Simultaneous transmission of multiple PDCCH-based WUSs may increase the use of PDCCH resources at the base station 105-a.

In some cases, a WUS 210 (e.g., a PDCCH-based WUS) may include additional fields indicating UE behavior after wake-up (e.g., such as a CSI trigger, a BWP ID, etc.). In some cases, a PDCCH-based WUS may wake-up multiple UEs 115 (e.g., via a group WUS 210). In some cases, such group WUSs 210 may be associated with less PDCCH overhead relative to UE-specific WUSs 210 for the same number of UEs 115. In some cases, UE-specific WUSs 210 may provide for increased flexibility in signaled fields to UEs 115 (e.g., unless group WUSs 210 are associated with significant increases in DCI size). A group PDCCH may have fine granularity in the information it signals. For example, slot format indication (SFI) (e.g., subframe indicator, DCI format 2-0) may include slot format for different UEs 115. A UE 115 may be configured with an offset (e.g., location) that it uses to extract intended slot format from the multiple slot formats.

The described techniques provide for efficient group WUSs 210 that may configure additional information (e.g., UE wake-up behavior information). For example, in some cases, instead of each UE being designated some number of bits or locations of a WUS 210 for wake-up indication and UE wake-up behavior configuration, DCI (e.g., WUSs 210) may be compressed or configured to efficiently indicate such wake-up indications and UE wake-up behavior configurations for a group of UEs 115 (e.g., for one or more UEs 115). As such, wireless communications systems may implement group WUSs 210 according to the techniques described herein such that a base station may convey wake-up information and UE wake-up behavior configuration information for a group of UEs 115 without necessarily adding some quantified or incremental DCI overhead for each additional UE 115 to be included in the group.

According to one or more aspects of the present disclosure, group WUSs 210 may be implemented by wireless communications system 200, such that one or more UEs 115 (e.g., UE 115-a) may receive a DCI associated with a WUS 210 and may identify whether the group WUS 210 includes a wake-up indication for the receiving UE. Further, the described techniques may provide for UE wake-up behavior configuration via WUSs 210. For example, upon receiving the DCI (e.g., the WUS 210), the UE 115-a may analyze the content of the DCI to identify whether a wake-up indication for the UE 115-a is present, and may further identify additional information configuring some UE wake-up behavior (e.g., such as a CSI trigger, an indication to activate some BWP, etc.). The described techniques provide for efficient signaling of such information (e.g., efficient signaling of group wake-up indications and UE wake-up behavior configuration information), to maintain reasonable DCI size and PDCCH performance. For example, the techniques described herein may provide for efficient DCI configurations (e.g., which in some cases may include or be referred to as DCI compression schemes) for indication of wake-up indications and UE wake-up behavior information for one or more UEs 115 (e.g., via WUSs 210 implementing such DCI configurations).

Figure 3:
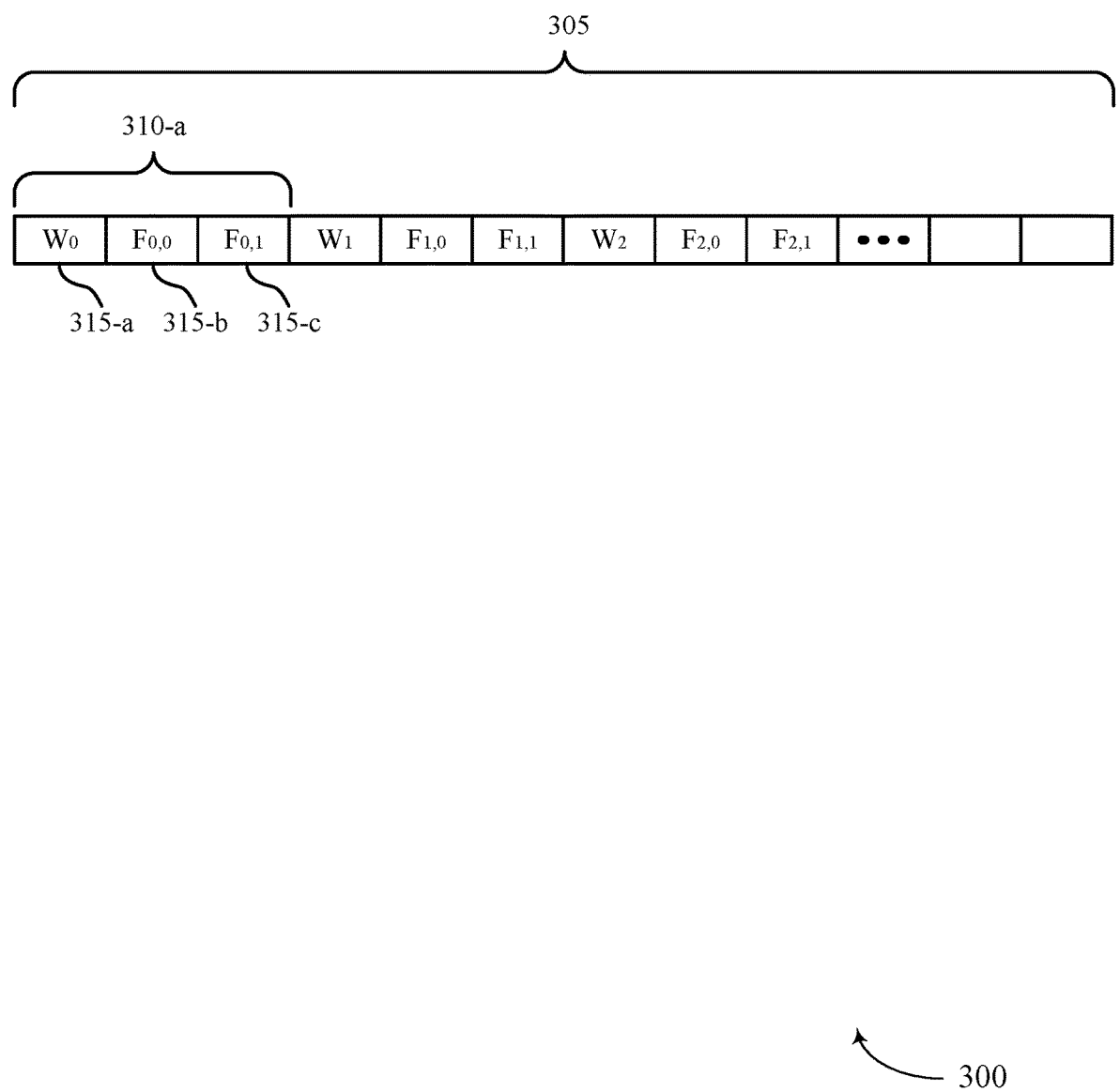
FIG. 3 illustrates an example of a DCI configuration that supports compression of group WUS in accordance with aspects of the present disclosure.

FIG. 3 illustrates an example of a DCI configuration 300 that supports compression of group WUS in accordance with aspects of the present disclosure. In some examples, DCI configuration 300 may implement aspects of wireless communications system 100 and/or wireless communications system 200. For example, in some cases, a WUS may be encoded according to DCI configuration 300 (e.g., DCI may be encoded according to DCI configuration 300 to convey group wake-up indication and UE wake-up behavior configuration information). In some cases, such WUS DCI may be conveyed by a base station 105 to one or more UEs 115. Generally, DCI configuration 300 may illustrate how various locations 310 of a DCI sequence 305 may be configured (e.g., DCI configuration 300 may illustrate how locations 310, which may in some cases refer to indices of fields or bits within DCI sequence 305, are configured to convey various wake-up indication information and/or UE wake-up behavior configuration information).

UEs may monitor and decode various locations 310 of a DCI sequence 305 (e.g., each location may include one or more information fields, such as fields 315). For example, in some cases, a UE may be associated with some monitoring index (e.g., which may either be RRC configured or derived, for example, from a UE identifier). Different UEs served by a base station may thus monitor different locations 310 of a DCI sequence 305 according to their monitoring index. For example, a UE may be configured with some monitoring index 0, and may thus monitor and decode location 310-a (e.g., fields $W_0$, $F_{0,0}$, $F_{0,1}$). As such, a base station may encode DCI (e.g., encode a group WUS) to convey various wake-up indications and/or UE wake-up behavior information based on knowledge of UE monitoring indices (e.g., a base station may encode DCI to include information for a UE at locations 310 in the DCI sequence 305 that correspond to the monitoring index of the UE).

In the example of FIG. 3, $W_i$ may refer to a wake-up indicator of an i-th location 310, and $F_{i,j}$ may refer to a field j in a location i. In some examples, $W_i$ may refer to a toggle bit indicating whether one or more UEs monitoring location i are to wake-up or transition to an active state (e.g., in some cases, $W_i=1$ may be referred to as a wake-up indication for one or more UEs with a monitoring index corresponding to the i-th location 310 of the DCI sequence 305). In some examples, $F_{i,j}$ may refer to an additional information field indicating, for example, UE wake-up behavior configuration information for one or more UEs monitoring location i. In some cases, a base station may configure a UE with a monitoring index i, the UE may monitor a location 310 corresponding to the monitoring index i and the UE may look up a location that corresponds to an index in a table.

DCI configuration 300 may illustrate a configuration where the DCI size (e.g., DCI overhead or PDCCH overhead) may increase in a fixed incremental fashion for each location or wake-up group the WUS DCI sequence 305 is to address. In the present example, each location 310 may be associated with three fields 315. As such, for each additional location 310 (e.g., or each additional wake-up group), three fields 315 (e.g., which may include three bits total or three fields of some number of bits each field) may be added to DCI. For example, in some cases, one or more UEs may be configured with a same monitoring index (e.g., and thus may be associated with a same wake-up group). A base station may wake-up a subset of wake-up groups (e.g., by setting wake-up indications, $W_i$, in fields 315 of locations 310 that correspond to monitoring indices of the subset of wake-up groups that are being activated, and not setting wake-up indications, $W_i$, in fields 315 of other locations 310 corresponding to monitoring indices of wake-up groups not included in the subset).

A UE may be configured to monitor a location 310 (e.g., some location i) based on a monitoring index. The location 310 may include a wake-up bit (e.g., field 315-a) followed by some fields (e.g., field 315-b and field 315-c). In some cases, additional information fields, $F_{i,j}$, may be explicit fields configuring UE wake-up behavior (e.g., may explicitly indicate a BWP ID that the UE is to wake-up and activate, a CSI trigger, etc.). Additionally or alternatively, additional information fields, $F_{i,j}$, may include LUT information (e.g., LUT IDs, LUT indices, etc.) for configuration of UE wake-up behavior. In some cases, a UE and a base station may each understand which fields 315 (e.g., which fields 315 corresponding to some location 310) include what information (e.g., a network may specify, or a base station may configure, whether a given field j, in any/all locations i, indicates a BWP ID, BWP LUT information, a CSI trigger, CSI LUT information, etc.).

Figure 4:
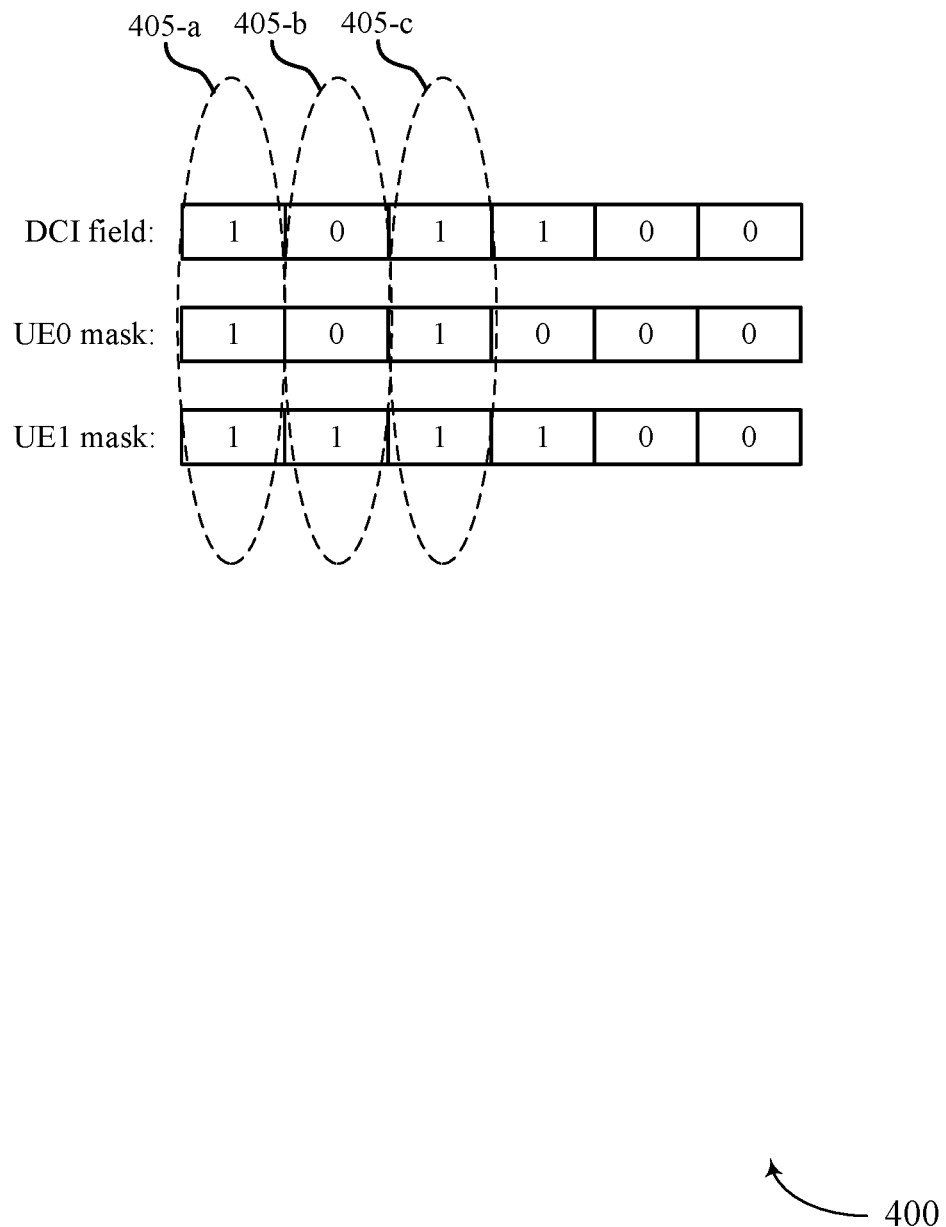
FIG. 4 illustrates an example of a UE wake-up mask diagram that supports compression of group WUS in accordance with aspects of the present disclosure.

FIG. 4 illustrates an example of a UE wake-up mask diagram 400 that supports compression of group WUS in accordance with aspects of the present disclosure. In some examples, UE wake-up mask diagram 400 may implement aspects of wireless communications system 100 and/or wireless communications system 200. For example, DCI (e.g., or a WUS) may be encoded in accordance with aspects of UE wake-up mask diagram to convey group wake-up indication. In some cases, such WUS DCI may be conveyed by a base station 105 to one or more UEs 115. In some examples, UE wake-up mask diagram 400 may illustrate how a DCI field may be encoded to convey group wake-up information according to one or more UE masks (e.g., UE WUS masks).

Generally, WUS DCI may indicate which UEs wake-up and which UEs do not wake-up (e.g., which UEs transition to an active state and which UEs remain in a low power state). As discussed herein, WUS DCI may include $W_i$ fields in a location i to indicate whether a group of one or more UEs monitoring the location i is to wake-up. In some examples, DCI or group WUSs may include a $W_{all}$ field (e.g., that corresponds to some location in DCI or in a group WUS that all UEs monitor) to indicate whether all UEs receiving the DCI or group WUS are to wake-up. In some examples, DCI or group WUSs may include both a $W_{all}$ field (e.g., that corresponds to some location in DCI or in a group WUS that all UEs monitor) as well as one or more $W_i$ fields (e.g., that correspond to a location i that some group of one or more UEs may monitor based on a group-specific or UE-specific monitoring index. In some examples, DCI or group WUSs may not include an explicit wake-up indication (e.g., W fields), and the DCI or group WUS itself may implicitly indicate that any UE that receives the DCI or group WUS is to wake-up. In other examples, a DCI field may indicate a sequence that receiving UEs may compare to a mask (e.g., a UE wake-up mask) to determine whether or not they are to wake-up (e.g., as illustrated in the example of FIG. 3).

That is, in some cases, DCI wake-up signaling may use a bitmap where the UE checks a configured location for wake-up indication. Alternatively, in some cases, instead of a direct bitmap, a set-membership method or a mask method may be used. For example, each UE may be assigned a mask or the mask may be derived or calculated (e.g., hashed) based on a UE identifier (e.g. C-RNTI). DCI may contain a field for the UE to compare the mask with. If all '1' bits in the UE mask are also '1's in the DCI field, the UE may be indicated to wake-up (e.g., in some aspects UE wake-up mask diagram 400 may implement aspects of a Bloom filter). Such an approach may provide for increased flexibility (e.g., as there may be no need to reconfigure all UEs to change the total number of UE). For example, a new UE or a new group may just be issued a mask (e.g., and the DCI overhead may not necessarily increase to include an indication for the new UE or the new group). In some cases, a UE may be issued a unique mask (e.g., to provide UE-specific granularity of wake-up indications). In other cases, a group of UEs (e.g., one or more UEs) may be issued a same mask (e.g., for wake-up group based wake-up indications).

UEs may receive the DCI and may compare bit locations 405 of their mask to the DCI field and determine if they are to wake-up. For example, a UE0 and UE1 may receive the DCI, and may compare their respective masks to the DCI field (e.g., the DCI wake-up indication field, the DCI wake-up mask, etc.). In the example of FIG. 4, UE0 may be indicated to wake-up (e.g., as bit locations 405-a and 405-c, which are set to '1' in the UE0 mask, may match the DCI field) and UE1 may not be indicated to wake-up (e.g., as bit location 405-b, which are set to '1' in the UE1 mask, may not match the DCI field). Generally, if all '1' bits in a UE mask (e.g., or wake-up group mask) are included in the DCI field, the UE (e.g., or UEs of a wake-up group) may wake-up.

Further, such a mask approach for wake-up indication may provide for flexibility in granularity of wake-up indications. For example, a base station or network may configure masks for wake-up groups or individual UEs. In cases where a new UE is to be added, the UE may either be added to an existing wake-up group mask, given a unique mask, or, in some cases, the DCI field may be extended to configure the new UE with a longer mask (e.g., to provide UE-specific wake-up indication for the UE) without altering or reconfiguring current masks of currently configured UEs (e.g., or of currently configured wake-up groups). In other cases, masks may be taken away or reconfigured to dynamically change wake-up groups (e.g., to dynamically add or remove UEs from a wake-up group).

Figure 5:
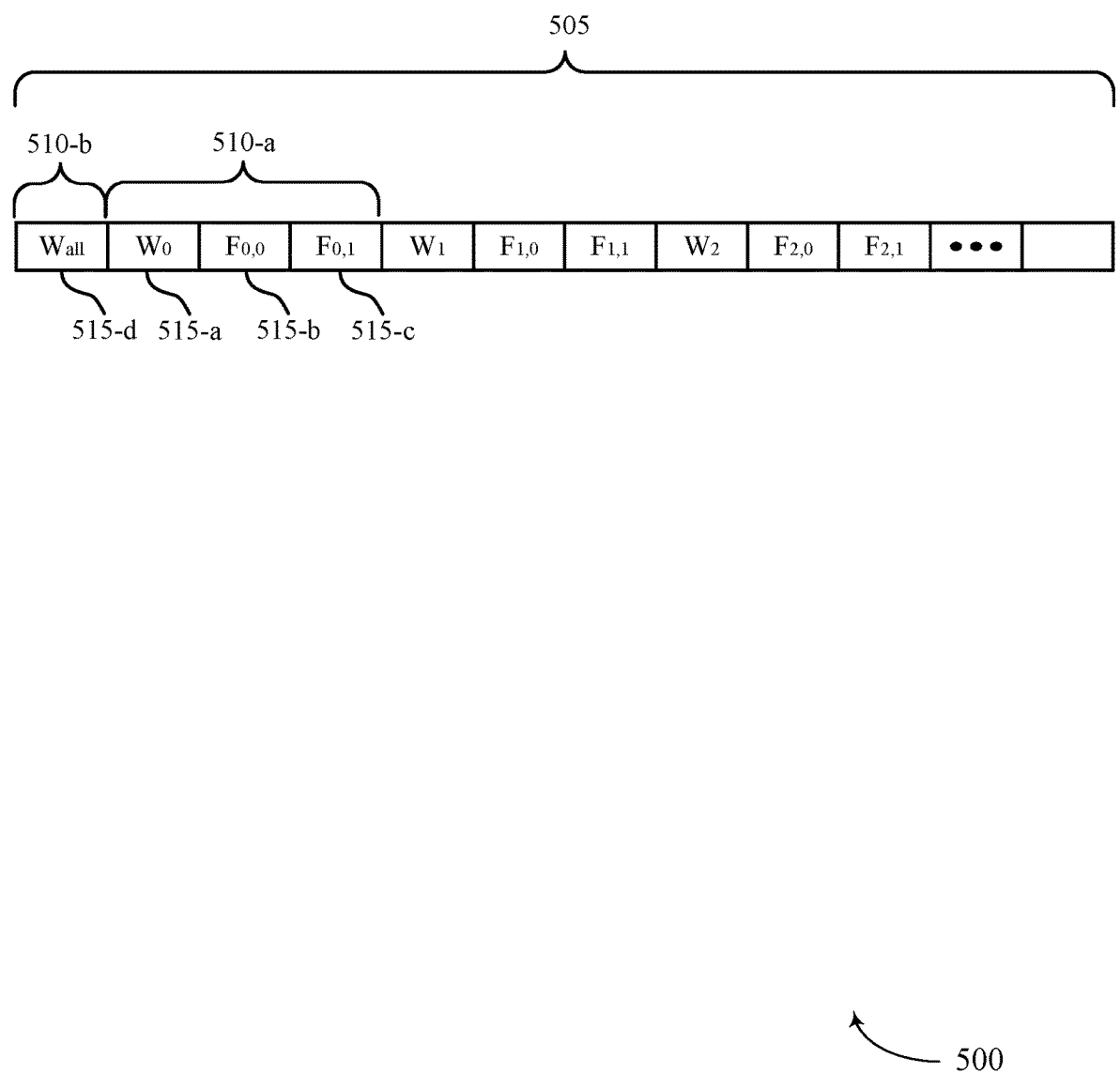
FIG. 5 illustrates an example of a DCI configuration that supports compression of group WUS in accordance with aspects of the present disclosure.

FIG. 5 illustrates an example of a DCI configuration 500 that supports compression of group WUS in accordance with aspects of the present disclosure. In some examples, DCI configuration 500 may implement aspects of wireless communications system 100 and/or wireless communications system 200. For example, in some cases, a WUS may be encoded according to DCI configuration 500 (e.g., DCI may be encoded according to DCI configuration 500 to convey group wake-up indication and UE wake-up behavior configuration information). In some cases, such WUS DCI may be conveyed by a base station 105 to one or more UEs 115.

Generally, DCI configuration 500 may illustrate how various locations 510 of a DCI sequence 505 may be configured (e.g., DCI configuration 500 may illustrate how locations 510, which may in some cases refer to indices of fields or bits within DCI sequence 505, are configured to convey various wake-up indication information and/or UE wake-up behavior configuration information).

UEs may monitor and decode various locations 510 of a DCI sequence 505 (e.g., and each location may include one or more information fields, such as fields 515). For example, in some cases, a UE may be associated with some monitoring index (e.g., which may either be RRC configured or derived, for example, from a UE identifier). Different UEs served by a base station may thus monitor different locations 510 of a DCI sequence 505 according to their monitoring index. For example, a UE may be configured with some monitoring index 0, and may thus monitor and decode location 510-a (e.g., fields $W_0$, $F_{0,0}$, $F_{0,1}$). As such, a base station may encode DCI (e.g., encode a group WUS) to convey various wake-up indications and/or UE wake-up behavior information based on knowledge of UE monitoring indices (e.g., a base station may encode DCI to include information for a UE at locations 510 in the DCI sequence 505 that correspond to the monitoring index of the UE). In the example of FIG. 5, $W_i$ may refer to a wake-up indicator of an i-th location 510, and $F_{i,j}$ may refer to a field j in a location i. In some examples, $W_i$ may refer to a toggle bit indicating whether one or more UEs monitoring location i are to wake-up or transition to an active state (e.g., in some cases, $W_i=1$ may be referred to as a wake-up indication for one or more UEs with a monitoring index corresponding to the i-th location 510 of the DCI sequence 505). In some examples, $F_{i,j}$ may refer to an additional information field indicating, for example, UE wake-up behavior configuration information for one or more UEs monitoring location i.

Further, in the example of FIG. 5, DCI sequence 505 may include a $W_{all}$ field. A bit, $W_{all}$, may be included in DCI to indicate that all UEs should wake-up. For example, all UEs may monitor a location 510-b corresponding to a field 515-d including a $W_{all}$ bit, in addition to locations corresponding to UE-specific monitoring index. For instance, a UE may be configured with some monitoring index 0, and may monitor location 510-b (e.g., by default) as well as location 510-a (e.g., corresponding to the monitoring index 0). The UE may thus, in some cases, monitor and decode fields 515-d, 515-a, 515-b, and 515-c.

In some examples, when $W_{all}$ is set and $W_i$ is set, the UE(s) associated with location i (e.g., the UE(s) with a monitoring index corresponding to a location i) may wake-up and $F_{i,j}$ fields (e.g., fields 515-b and 515-c) may present and indicate UE wake-up behavior. In some examples, when $W_{all}$ is set and $W_i$ is not set, the UE(s) associated with location i wake(s) up and the $F_{i,j}$ fields, for the location i corresponding to the $W_i$ that is not set, may be absent. In such examples, the UE(s) may follow the behavior indicated in location i−1 or the behavior indicated in location i+1 (e.g., this could be recursive: if $W_{i-1}$ is not set, the UE may follow the behavior indicated in location i−2), the UE(s) may follow the behavior indicated in some default DCI location, the UE(s) may follow the behavior configured via RRC, the UE(s) may follow specific default behavior, the UE(s) may follow behavior from the last on-duration, etc. As such, DCI may be encoded based on which UEs are to be configured with similar UE wake-up behavior, and DCI overhead may be reduced (e.g., compressed). In some cases, DCI may be padded to maintain some constant size.

In some cases, WUS DCI may be encoded such that each UE is configured with two bits. For example, in some cases, each location 510 may include two indicator bits, $W_{i,0}$ and $W_{i,1}$. The combination of $W_{i,0}$ and $W_{i,1}$ may define UE wake-up behavior. As an example, if $W_{i,0}$=0 and $W_{i,1}$=0: The UE(s) may not wake-up.

if $W_{i,0}$=1 and $W_{i,1}$=0: The UE(s) may wake-up and may follow predefined/configured/other location behavior.

if $W_{i,0}$=1 and $W_{i,1}$=1: The UE(s) may wake-up and may follow behavior indicated in $F_{i,j}$ if $W_{i,0}$=0 and $W_{i,1}$=1: Reserved, or the UE(s) may wake-up and A-CSI is triggered or UE follows predefined/configured/ other location behavior.

If $W_{all}$ is present, $W_{i,0}$ may be omitted and the combination of $W_{all}$ and $W_{i,1}$ may indicate behavior (e.g., as in the example above, where $W_{all}$ takes the place of $W_{i,0}$). As such, WUS DCI may be encoded with two bits per UE, or one bit per UE and a global $W_{all}$ bit, to convey wake-up indications and UE wake-up behavior information for a group of one or more UEs.

Figure 6A:
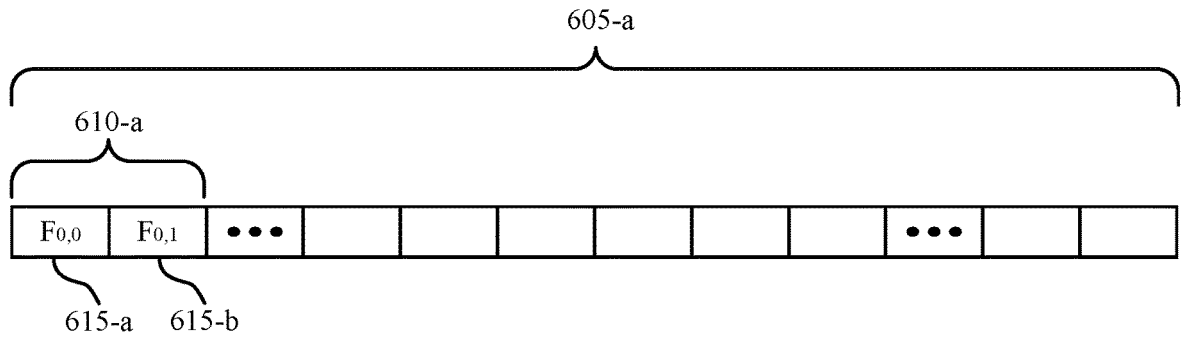
FIGS. 6A and 6B illustrate examples of DCI configurations that support compression of group WUS in accordance with aspects of the present disclosure.
Figure 6B:
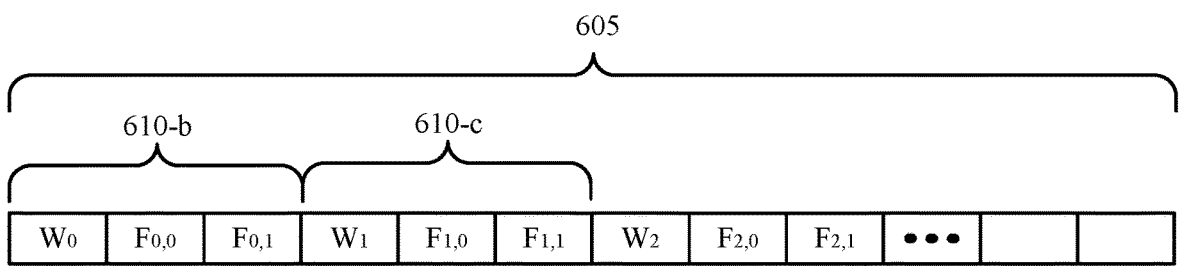

FIG. 6A and FIG. 6B illustrate example DCI configuration 600 and DCI configuration 601 that support compression of group WUS in accordance with aspects of the present disclosure. In some examples, DCI configuration 600 and DCI configuration 601 may implement aspects of wireless communications system 100 and/or wireless communications system 200. For example, in some cases, a WUS may be encoded according to DCI configuration 600 or DCI configuration 601 (e.g., DCI may be encoded according to DCI configuration 600 or DCI configuration 601 to convey group wake-up indication and UE wake-up behavior configuration information). In some cases, such WUS DCI may be conveyed by a base station 105 to one or more UEs 115. Generally, DCI configuration 600 and DCI configuration 601 may illustrate how various locations 610 of a DCI sequence 605 may be configured (e.g., DCI configuration 600 and DCI configuration 601 may illustrate how locations 610, which may in some cases refer to indices of fields or bits within a DCI sequence 605, are configured to convey various wake-up indication information and/or UE wake-up behavior configuration information).

UEs may monitor and decode various locations 610 of a DCI sequence 605 (e.g., and each location may include one or more information fields, such as fields 615). For example, in some cases, a UE may be associated with some monitoring index (e.g., which may either be RRC configured or derived, for example, from a UE identifier). Different UEs served by a base station may thus monitor different locations 610 of a DCI sequence 605 according to their monitoring index. For example, a UE may be configured with some monitoring index 0, and may thus monitor and decode location 610-a (e.g., fields $F_{0,0}$ and $F_{0,1}$). As such, a base station may encode DCI (e.g., encode a group WUS) to convey various wake-up indications and/or UE wake-up behavior information based on knowledge of UE monitoring indices (e.g., a base station may encode DCI to include information for a UE at locations 610 in the DCI sequence 605 that correspond to the monitoring index of the UE). In the example of FIG. 6B, $W_i$ may refer to a wake-up indicator of an i-th location 610. In the examples of FIGS. 6A and 6B, $F_{i,j}$ may refer to a field j in a location i. In some examples, $W_i$ may refer to a toggle bit indicating whether one or more UEs monitoring location i are to wake-up or transition to an active state (e.g., in some cases, $W_i$=1 may be referred to as a wake-up indication for one or more UEs with a monitoring index corresponding to the i-th location 610 of the DCI sequence 605). In some examples, $F_{i,j}$ may refer to an additional information field indicating, for example, UE wake-up behavior configuration information for one or more UEs monitoring location i.

In the example of FIG. 6A, if only one location i is configured in the group WUS (e.g., location 610-a), the bits $W_i$ may be omitted and the UE(s) may wake-up if the PDCCH is received and may be configured with wake-up behavior included in the WUS DCI, such as in fields 615-a and 615-b (e.g., the WUS DCI may implicitly indicate receiving UE(s) are to wake-up, and the information fields of the DCI may indicate wake-up behavior for receiving UE(s)). In the example of FIG. 6B, multiple locations may be configured (e.g., locations 610-b, 610-c, etc.). In some cases, no W bits may be included in WUS DCI and the entire group may be woken up simultaneously and UEs may obtain parameters from fields $F_i$ according to a configured monitoring index.

In some cases (e.g., for carrier aggregation (CA)/dual connectivity (DC) aspects), a single UE may be configured to check multiple locations in the WUS DCI, in which case each location may correspond to, for example, a cell configured for that UE. The WUS DCI may be limited to a configurable subset of the cells configured for the UE. For instance, in the example of FIG. 6B, a UE may monitor location 610-b (e.g., which may include wake-up information and UE wake-up behavior configuration information for a first cell) and may monitor location 610-c (e.g., which may include wake-up information and UE wake-up behavior configuration information for a second cell). As such, a network or base station may (e.g., via WUS DCI) wake-up a UE on one or more specific cells and/or configure the same or different UE wake-up behavior on the one or more cells (e.g., a base station may configure UE activation different BWPs or may configure different CSI reports for different cells).

Figure 7:
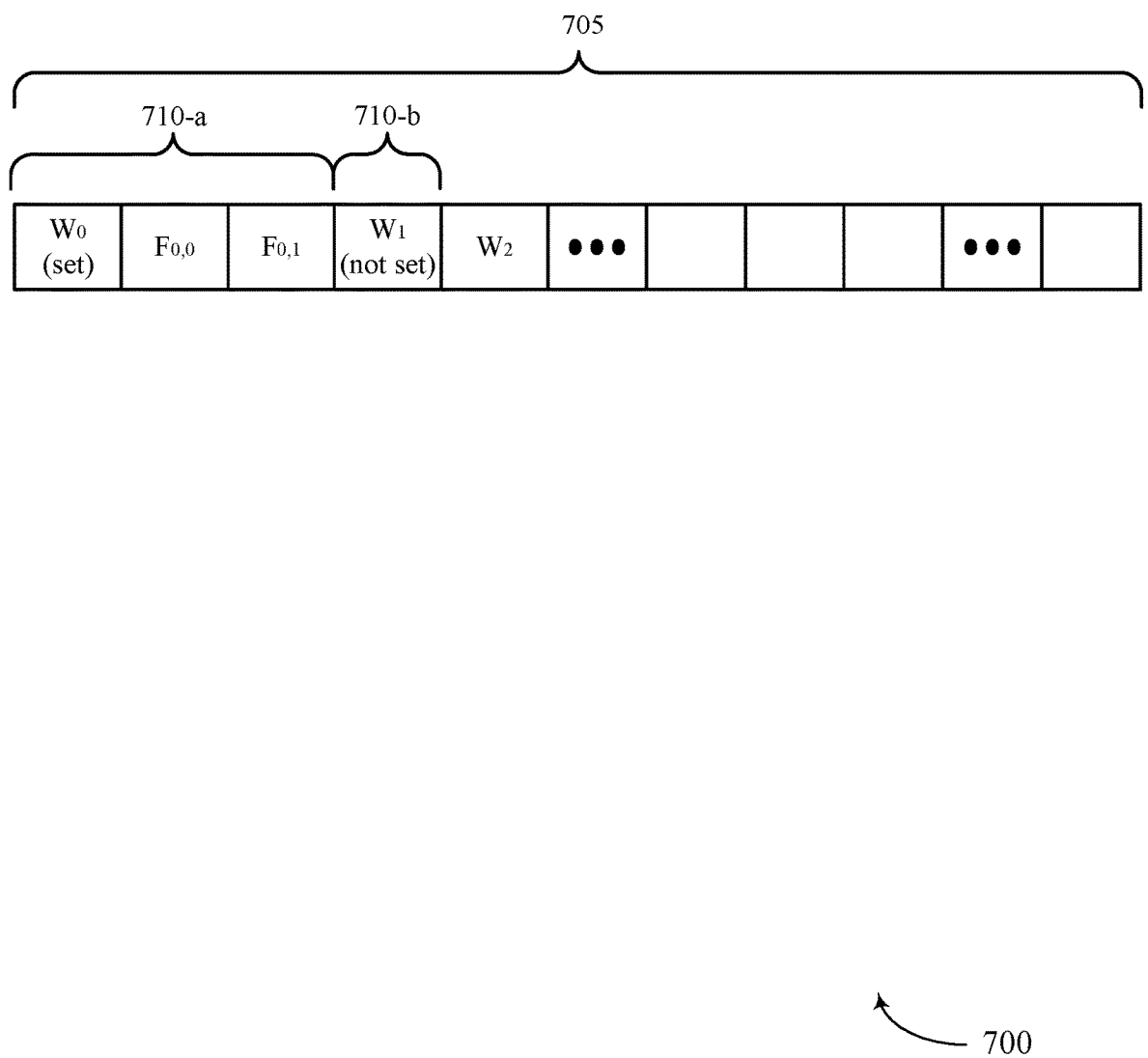
FIG. 7 illustrates an example of a DCI configuration that supports compression of group WUS in accordance with aspects of the present disclosure.

FIG. 7 illustrates an example of a DCI configuration 700 that supports compression of group WUS in accordance with aspects of the present disclosure. In some examples, DCI configuration 700 may implement aspects of wireless communications system 100 and/or wireless communications system 200. For example, in some cases, a WUS may be encoded according to DCI configuration 700 (e.g., DCI may be encoded according to DCI configuration 700 to convey group wake-up indication and UE wake-up behavior configuration information). In some cases, such WUS DCI may be conveyed by a base station 105 to one or more UEs 115. Generally, DCI configuration 700 may illustrate how various locations 710 of a DCI sequence 705 may be configured (e.g., DCI configuration 700 may illustrate how locations 710, which may in some cases refer to indices of fields or bits within DCI sequence 705, are configured to convey various wake-up indication information and/or UE wake-up behavior configuration information).

UEs may monitor and decode various locations 710 of a DCI sequence 705 (e.g., and each location may include one or more information fields). For example, in some cases, a UE may be associated with some monitoring index (e.g., which may either be RRC configured or derived, for example, from a UE identifier). Different UEs served by a base station may thus monitor different locations 710 of a DCI sequence 705 according to their monitoring index. For example, a UE may be configured with some monitoring index 0, and may thus monitor and decode location 710-a (e.g., fields $W_0$, $F_{0,0}$, $F_{0,1}$). As such, a base station may encode DCI (e.g., encode a group WUS) to convey various wake-up indications and/or UE wake-up behavior information based on knowledge of UE monitoring indices (e.g., a base station may encode DCI to include information for a UE at locations 710 in the DCI sequence 705 that correspond to the monitoring index of the UE). In the example of FIG. 7, $W_i$ may refer to a wake-up indicator of an i-th location 710, and $F_{i,j}$ may refer to a field j in a location i. In some examples, $W_i$ may refer to a toggle bit indicating whether one or more UEs monitoring location i are to wake-up or transition to an active state (e.g., in some cases, $W_i=1$ may be referred to as a wake-up indication for one or more UEs with a monitoring index corresponding to the i-th location 710 of the DCI sequence 705). In some examples, $F_{i,j}$ may refer to an additional information field indicating, for example, UE wake-up behavior configuration information for one or more UEs monitoring location i.

In the example of FIG. 7, if $W_i$ is set (e.g., if $W_i=1$), the fields $F_{i,j}$ may be present (e.g., otherwise, $F_{i,j}$ fields may be omitted). In such cases, a UE may only wake-up when the associated $W_i$ (e.g., the $W_i$ associated with the UE's monitoring index) is set. For example, $W_0$ may be set, and location 710-a may include fields $F_{0,0}$ and $F_{0,1}$. Further, W may not be set, and location 710-b may not include $F_{i,j}$ fields. In cases where a UE has a monitoring index corresponding to location 710-a, the UE may monitor and decode $W_0$, $F_{0,0}$, $F_{0,1}$. The $W_0$ bit may indicate the UE is to wake-up, and the $F_{0,0}$ and $F_{0,1}$ fields may configure the UE wake-up behavior. In cases where a UE has a monitoring index corresponding to location 710-b, the UE may monitor and decode $W_1$ and may determine the UE is not being indicate to wake-up (e.g., the UE may determine that no transmissions or receptions are to be scheduled). Such techniques may save DCI overhead corresponding to UE wake-up behavior configuration information for UEs or groups of UEs that are not being activated.

Figure 8:
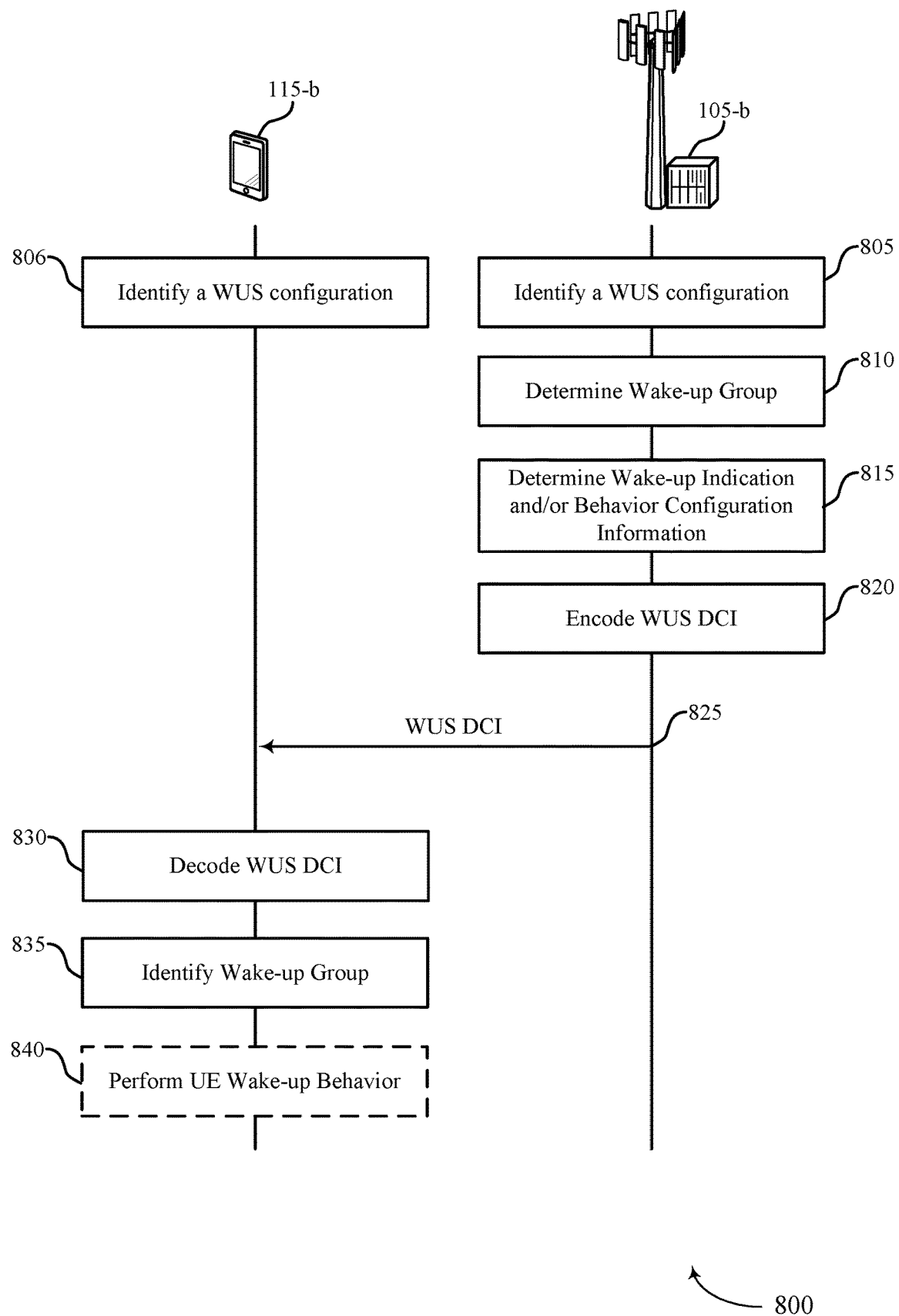
FIG. 8 illustrates an example of a process flow that supports compression of group WUS in accordance with aspects of the present disclosure.

FIG. 8 illustrates an example of a process flow 800 that supports compression of group WUS in accordance with aspects of the present disclosure. In some examples, process flow 800 may implement aspects of wireless communications system 100 and/or wireless communications system 200. Further, process flow 800 may be implemented by a UE 115-b and a base station 105-b, which may be examples of a UE 115 and a base station 105 described with reference to FIGS. 1-2. In some aspects, UE 115-b may be an example of a device described with reference to FIGS. 1-6. In the following description of the process flow 800, the operations between UE 115-b and base station 105-b may be transmitted in a different order than the order shown, or the operations performed by base station 105-b and UE 115-b may be performed in different orders or at different times. Certain operations may also be left out of the process flow 800, or other operations may be added to the process flow 800. It is to be understood that while base station 105-b and UE 115-b are shown performing a number of the operations of process flow 800, any wireless device may perform the operations shown.

At 805, base station 105-b may identify a WUS configuration, where the WUS configuration includes a monitoring index associated with a WUS in DCI (e.g., WUS DCI) and an information format (e.g., DCI configuration) associated with the WUS. At 806, UE 115-b may identify a WUS configuration, where the WUS configuration includes a monitoring index associated with a WUS and an information format associated with the WUS. 805 and 806 may occur at the same time or at different times. In some cases, base station 105-b may indicate the WUS configuration to the UE 115-b via RRC signaling. In some cases, the WUS configuration may be specified by the network and may be identified by the base station 105-b and UE 115-b.

At 810, base station 105-b may determine whether a UE 115-b is part of a wake-up group (e.g., base station 105-b may determine to wake-up UE 115-b). For example, UE 115-b may determine whether the UE 115-b is part of the wake-up group based on the identified wake-up group.

At 815, base station 105-b may determine a wake-up indication (e.g., one or more $W_i$ bits) and an indication of behavior configuration information (e.g., $F_{i,j}$ fields, combinations of $W_{i,0}$ and $W_i$, bits, combinations of a $W_{all}$ bit and $W_i$ bits, etc.) based on the determination of whether the UE 115-b is part of the wake-up group and the information format associated with the WUS (e.g., based on the WUS DCI configuration, such as the configuration fields or bits of the DCI sequence). For example, the base station 105-b may identify a monitoring index of the UE 115-b, and may determine $F_{i,j}$ fields, combinations of $W_{i,0}$ and $W_{i,1}$ bits, combinations of a $W_{all}$ bit and $W_i$ bits, etc. for a location i that corresponds to the monitoring index of the DCI sequence.

In some cases, base station 105-b may identify a CSI report trigger and/or an indication of a BWP, where the indication of behavior configuration information may be determined based on the identification of one or both of the CSI report trigger and the indication of the BWP. In some cases, the base station 105-b may determine one or more UEs 115 that are part of the wake-up group, identify a UE mask for UE 115 comparison with the wake-up indication (e.g., of each of the determined one or more UEs 115 that are part of the wake-up group), and determine a bit sequence of the wake-up indication (e.g., of a DCI field) based on the identified mask of each of the determined one or more UEs 115 that are part of the wake-up group. In some cases, the UE mask(s) may be identified based on RRC signaling, a UE identifier, etc.

At 820, base station 105-b may encode the WUS based on the identified WUS configuration. For example, the base station 105-b may encode information in $F_{i,j}$ fields, combinations of $W_{i,0}$ and $W_{i,1}$ bits, combinations of a $W_{all}$ bit and $W_i$ bits, etc. of some identified WUS configuration to appropriately include wake-up indication and wake-up behavior information for one or more UEs (e.g., according UE monitoring indices).

At 825, base station 105-b may transmit the encoded WUS, where the encoded WUS includes the determined wake-up indication and the determined indication of behavior configuration information.

At 830, UE 115-b may decode the WUS (e.g., received at 825) based on the WUS configuration (e.g., identified at 806), where the WUS may include a wake-up indication and an indication of behavior configuration information. In some cases, UE 115-b may identify a mask for comparison with the wake-up indication, and may compare the identified mask with a bit sequence of the wake-up indication (e.g., with a DCI field or DCI mask of the WUS DCI), where the identification of the wake-up group is based on the comparison (e.g., where the UE 115-b identifies whether or not to wake-up based on the comparison).

In some cases, UE 115-b may identify behavior configuration information based on a value of the wake-up indication and a value of a bit corresponding to the monitoring index (e.g., $W_{all}$ and $W_i$ may indicate UE behavior or location of UE behavior information). In some cases, a presence of the behavior configuration information in the WUS may be based on the value of the wake-up indication and the value of the bit corresponding to the monitoring index (e.g., when $W_{all}$ is set, and $W_i$ is set, the fields $F_{i,j}$ may be present and indicate UE behavior). In some cases, a location of the indication of behavior configuration information may be based on the value of the wake-up indication and the value of a bit corresponding to the monitoring index (e.g., when $W_{all}$ is set and $W_i$ is set, $F_{i,j}$ fields may follow $W_i$; or when $W_{all}$ is set and $W_i$ is not set, the UE may follow behavior indicated in some default location, in a location i−1, in a location i+1, etc.). In some cases, the indication of behavior configuration information may include the wake-up indication and a bit corresponding to the monitoring index (e.g., if $W_{all}$ is present, $W_{i,0}$ can be omitted and the combination $W_{all}$ and $W_{i,1}$ may indicate wake-up behavior). In some cases, the wake-up indication may include two or more bits corresponding to the monitoring index.

At 835, UE 115-b may identify a wake-up group based on the wake-up indication (e.g., the UE 115-b may identify whether or not to wake-up based on the WUS DCI). For example, UE 115-b may monitor some $W_i$ corresponding to its monitoring index and may identify it is part of a wake-up group based on the $W_i$ being set in the WUS DCI. Further, UE 115-b may identify one or more behavior configuration information fields of the WUS based on the identified wake-up group (e.g., based on the wake-up indication) and the identified WUS configuration (e.g., based on whether a $W_i$ bit is set and whether the DCI configuration includes $F_{i,j}$ fields, combinations of $W_{i,0}$ and $W_{i,1}$ bits, combinations of a $W_{all}$ bit and $W_i$ bits, etc.), and may decode the identified one or more behavior configuration information fields for the UE 115-b. For example, UE 115-b may identify a CSI report trigger and/or an indication of a BWP (e.g., an indication to activate a BWP) based on decoding the identified one or more behavior configuration information fields.

In cases where the WUS DCI indicates wake-up behavior configuration information for the UE 115-b, the UE 115-b may, at 840, perform any configured wake-up behavior. For example, in some cases, the UE 115-b may transmit a CSI report based on one or more of the CSI report trigger, a default CSI report, and RRC signaling (e.g., in cases where the wake-up behavior information triggers a CSI report). In some examples, the UE 115-b may activate the BWP based on one or more of the indication of the BWP, a last BWP used in a last on-duration, a default BWP, and an RRC configured BWP (e.g., in cases where the wake-up behavior information includes a BWP activation indication).

Figure 9A:
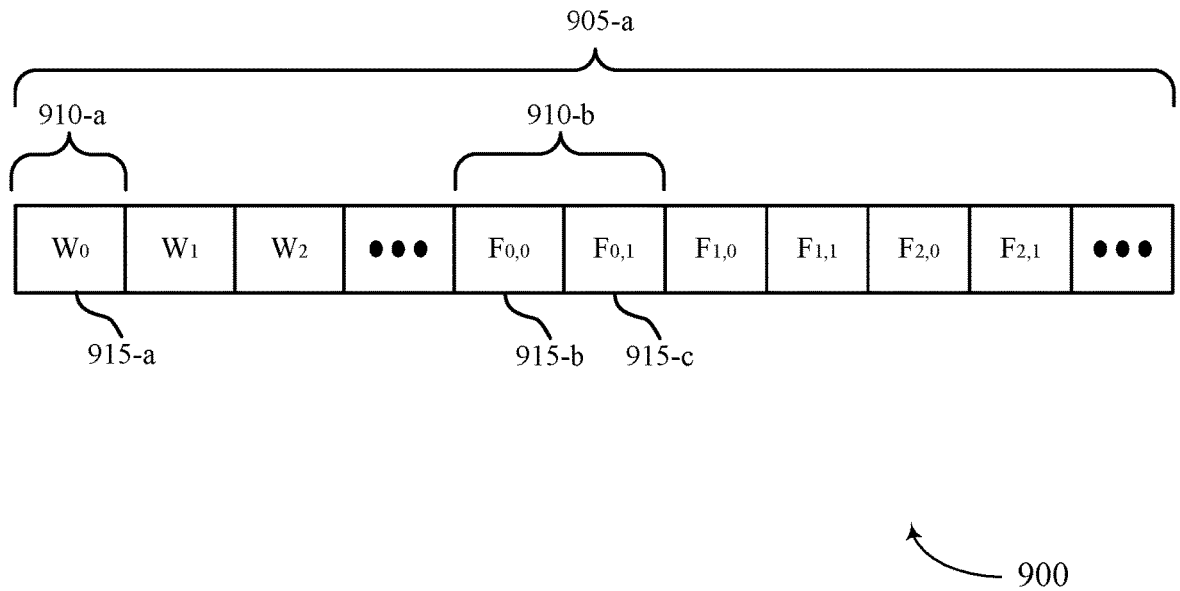
FIG. 9A and FIG. 9B illustrate example DCI configuration and DCI configuration that support compression of group WUS in accordance with aspects of the present disclosure.
Figure 9B:
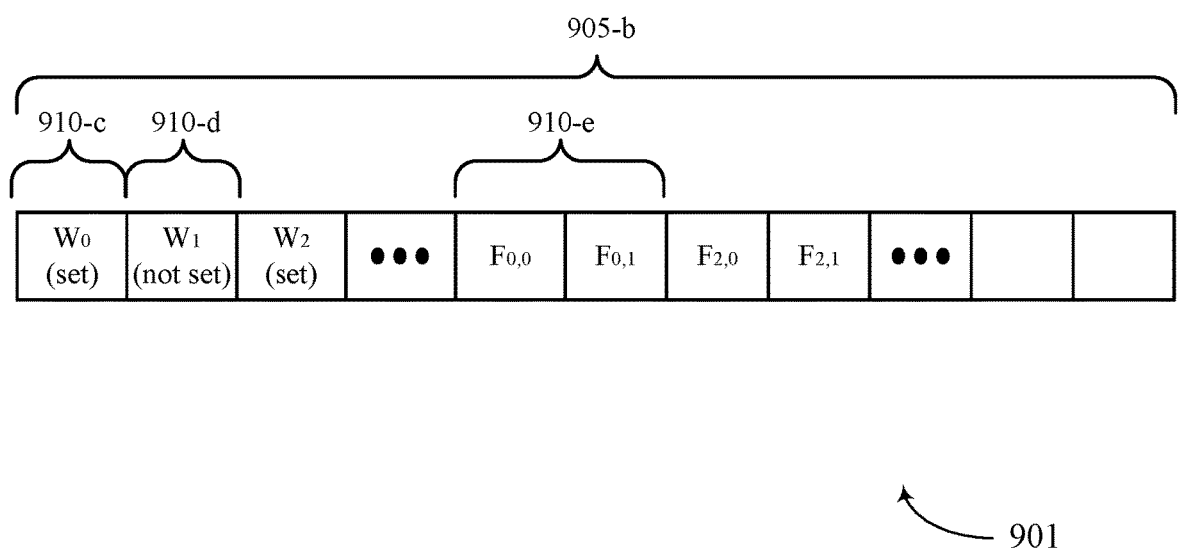

FIG. 9A and FIG. 9B illustrate example DCI configuration 900 and DCI configuration 901 that support compression of group WUS in accordance with aspects of the present disclosure. In some examples, DCI configuration 900 and DCI configuration 901 may implement aspects of wireless communications system 100 and/or wireless communications system 200. For example, in some cases, a WUS may be encoded according to DCI configuration 900 or DCI configuration 901 (e.g., DCI may be encoded according to DCI configuration 900 or DCI configuration 901 to convey group wake-up indication and UE wake-up behavior configuration information). In some cases, such WUS DCI may be conveyed by a base station 105 to one or more UEs 115. Generally, DCI configuration 900 and DCI configuration 901 may illustrate how various locations 910 of a DCI sequence 905 may be configured (e.g., DCI configuration 900 and DCI configuration 901 may illustrate how locations 910, which may in some cases refer to indices of fields or bits within a DCI sequence 905, are configured to convey various wake-up indication information and/or UE wake-up behavior configuration information).

UEs may monitor and decode various locations 910 of a DCI sequence 905 (e.g., and each location may include one or more information fields, such as fields 915). For example, in some cases, a UE may be associated with some monitoring index (e.g., which may either be RRC configured or derived, for example, from a UE identifier). Different UEs served by a base station may thus monitor different locations 910 of a DCI sequence 905 according to their monitoring index. As such, a base station may encode DCI (e.g., encode a group WUS) to convey various wake-up indications and/or UE wake-up behavior information based on knowledge of UE monitoring indices (e.g., a base station may encode DCI to include information for a UE at locations 910 in the DCI sequence 905 that correspond to the monitoring index of the UE).

In example DCI configuration 900 and example DCI configuration 901, wake-up indications (e.g., $W_i$ bits) may be grouped together in the WUS DCI and UE wake-up behavior indication fields (e.g., $F_{i,j}$ fields) may also be grouped together. In the example of FIG. 9A, all fields (e.g., all $F_{i,j}$ fields corresponding to included $W_i$ bits) may be present in the DCI sequence 905-a. For example, a UE may be configured with some monitoring index 0, and may thus monitor and decode location 910-a (e.g., field 915-a or bit $W_0$) as well as location 910-b (e.g., fields 915-b and 915-c or fields $F_{0,0}$ and $F_{0,1}$). In the example of FIG. 9B, additional information, such as UE wake-up behavior configuration information, may be included when a corresponding wake-up indication is configured. For example, a UE may be configured with some monitoring index 0, and may thus monitor and decode location 910-c (e.g., $W_0$). As the $W_0$ bit is set (e.g., $W_0=1$) in the example DCI sequence 905-b, the UE may then monitor and decode location 910-e (e.g., fields $F_{0,0}$ and $F_{0,1}$) based on the wake-up indication (e.g., $W_0$). In cases where a UE is configured with some monitoring index 1, the UE may monitor and decode location 910-d (e.g., $W_1$). As the $W_1$ bit is not set (e.g., $W_1=0$) in the example DCI sequence 905-b, there may be no additional information (e.g., no fields $F_{1,0}$ and $F_{1,1}$ included in the WUS DCI for the UE (e.g., as the WUS DCI may not include an indication for the UE, associated with a monitoring index of 1, to wake-up).

For example, a base station may determine a group of wake-up indications (e.g., a group of $W_i$ values) for the WUS DCI. The base station may determine a group of indications of behavior configuration information (e.g., $F_{i,j}$ fields) based on the determined group of wake-up indications. In some cases, the WUS DCI may be encoded to include $F_{i,j}$ fields for each corresponding $W_i$ filed regardless of whether the $W_i$ is set. In some cases, the WUS DCI may be encoded to include $F_{i,j}$ fields for each corresponding $W_i$ that is set (e.g., the determined group of indications of behavior configuration information (e.g., $F_{i,j}$ fields) may only include $F_{i,j}$ fields for set $W_i$ fields. The WUS DCI may then be encoded to include the group of wake-up indications followed by the group of indications of behavior configuration information.

Various other DCI configurations and DCI sequences for WUS DCI may be implemented by analogy, without departing from the scope of the present disclosure. Aspects of the example DCI configurations and DCI sequences may be modified or combined in accordance with the described techniques. For example, in general, WUS DCI may be configured to include any number of bits or fields to convey wake-up indications and/or UE wake-up behavior configuration information (e.g., WUS DCI may convey 1, 2, 3, 4, etc. $F_{i,j}$ fields corresponding to $W_i$ bits). In some cases, locations of $F_{i,j}$ fields and/or $W_i$ bits may be rearranged in a DCI sequence, while employing compression of group WUS described herein). Further, a UE may be configured with any number of monitoring indices for WUS DCI.

Figure 10:
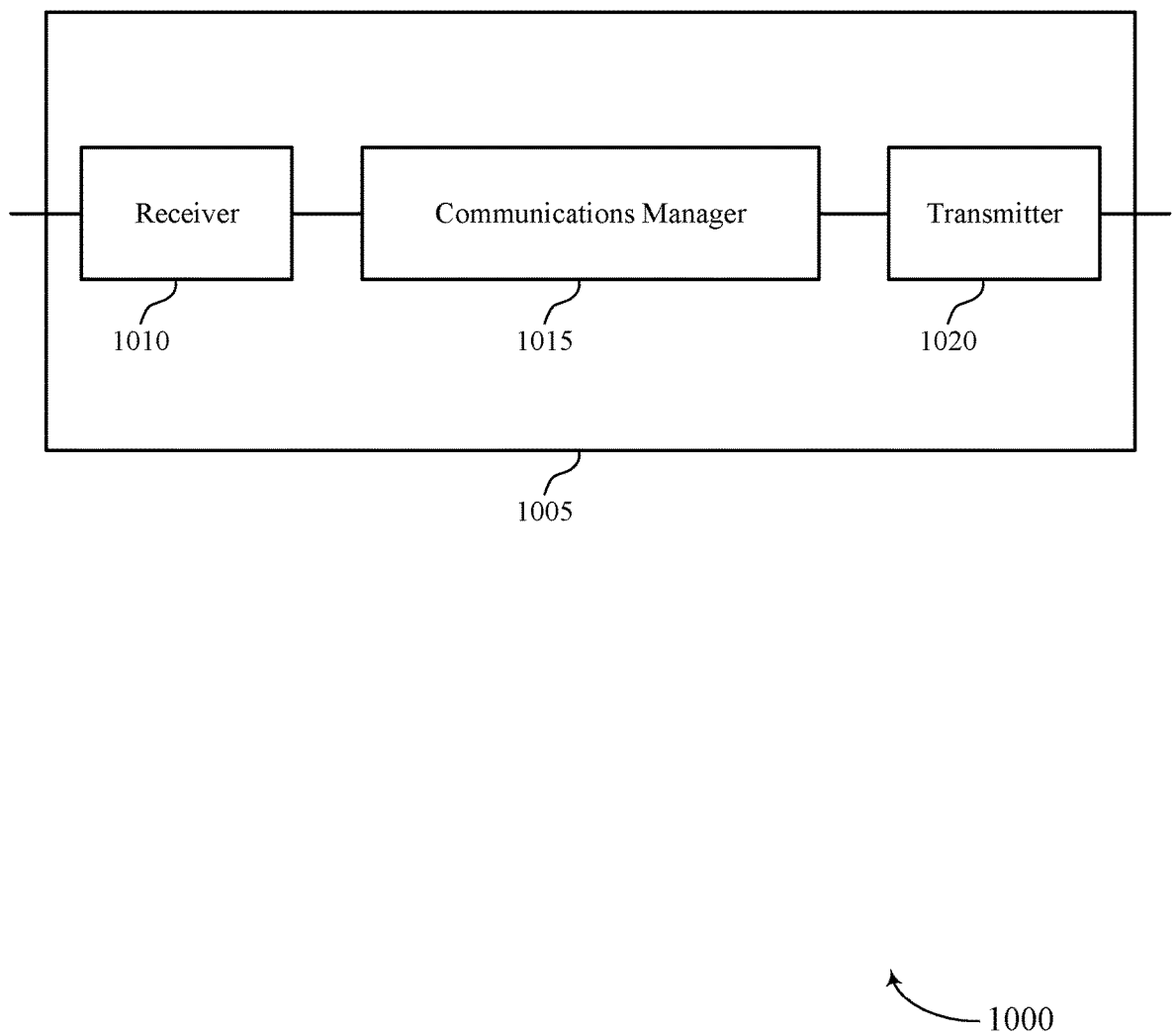
FIGS. 10 and 11 show diagrams of devices that support compression of group WUS in accordance with aspects of the present disclosure.

FIG. 10 shows a diagram 1000 of a device 1005 that supports compression of group WUS in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to compression of group WUS, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a WUS configuration, where the WUS configuration includes at least a monitoring index associated with a WUS and an information format associated with the WUS, receive the WUS, decode the received WUS based on the identified WUS configuration, where the WUS includes a wake-up indication and an indication of behavior configuration information, and determine whether the UE is part of a wake-up group associated with the wake-up signal based at least in part on decoding the received wake-up signal. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 may be implemented as an integrated circuit or chipset for a mobile device modem, and the receiver 1010 and transmitter 1020 may be implemented as analog components (e.g., amplifiers, filters, antennas, etc.) coupled with the mobile device modem to enable wireless transmission and reception over one or more bands.

The communications manager 1015 as described herein may be implemented to realize one or more potential advantages. One implementation may enable the device 1005 to more efficiently wake-up or transition from a sleep mode to an active mode (e.g., for transmitting or receiving on a communication channel), which may reduce a number of unnecessary wake-up occasions.

Based on techniques for reducing the number of unnecessary wake-up occasions, a processor or one or more processing units of the device 1005 may perform fewer processing operations and spend longer durations in a sleep mode, which may result in improved power savings and increased battery life of the device 1005.

Figure 11:
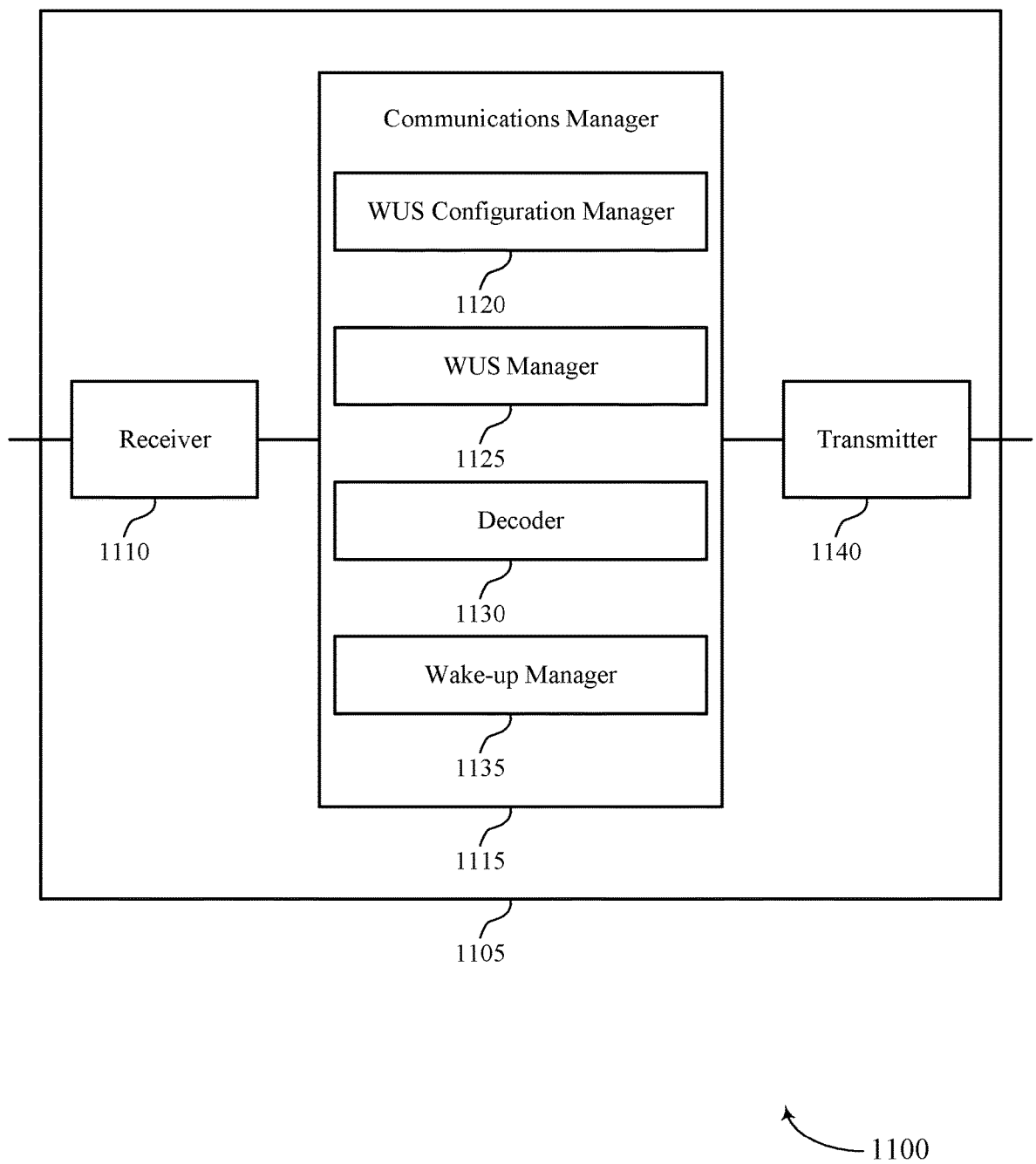

FIG. 11 shows a diagram 1100 of a device 1105 that supports compression of group WUS in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to compression of group WUS, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a WUS configuration manager 1120, a WUS manager 1125, a decoder 1130, and a wake-up manager 1135. The communications manager 1115 may be an example of aspects of the communications manager 1310 described herein. The WUS configuration manager 1120 may identify a WUS configuration, where the WUS configuration includes a monitoring index associated with a WUS and an information format associated with the WUS. The WUS manager 1125 may receive the WUS. The decoder 1130 may decode the received WUS based on the identified WUS configuration, where the WUS includes a wake-up indication and an indication of behavior configuration information. The wake-up manager 1135 may identify a wake-up group based on the wake-up indication. The wake-up manager 1135 may determine whether the UE is part of a wake-up group associated with the wake-up signal based at least in part on decoding the received wake-up signal.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
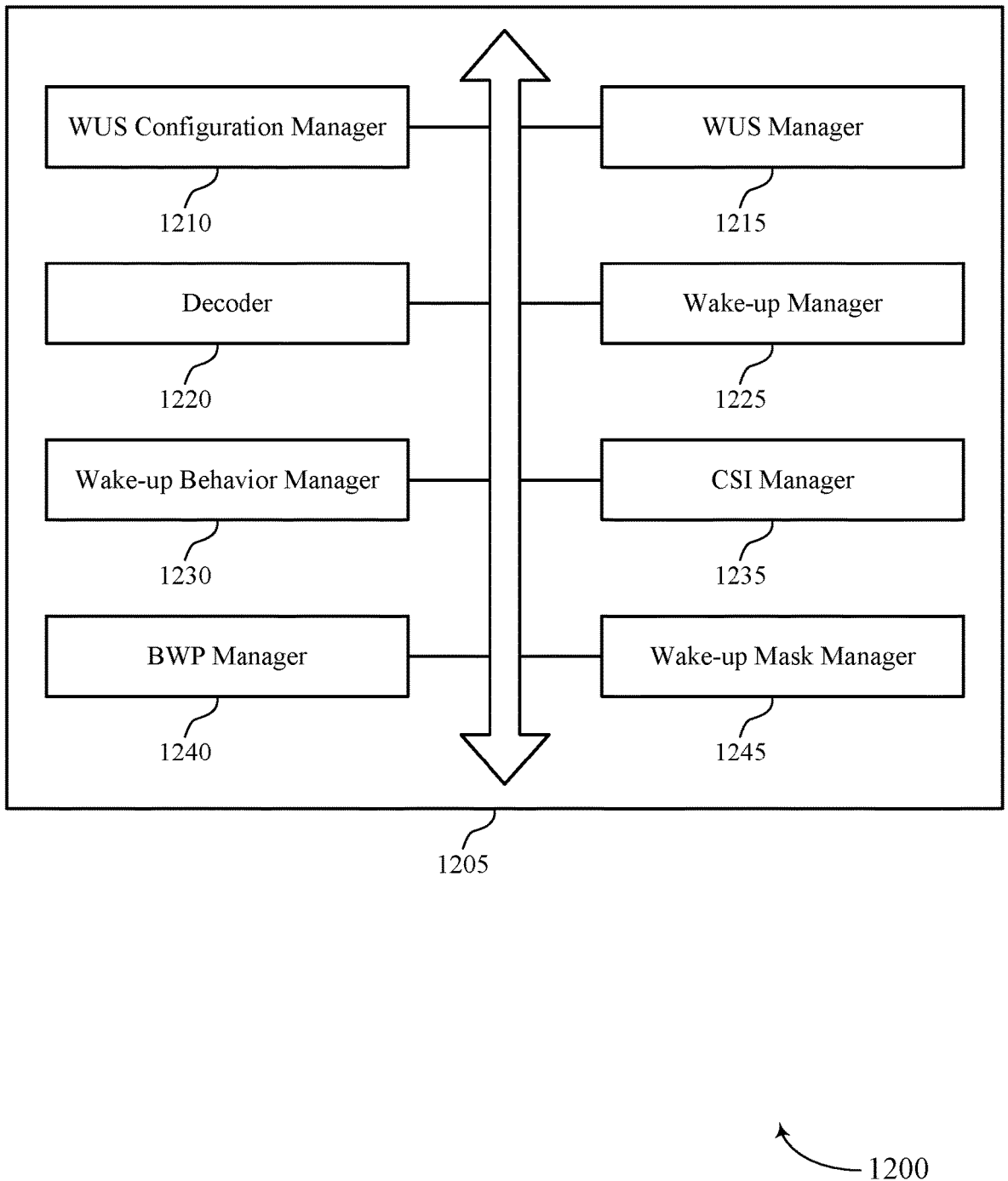
FIG. 12 shows a diagram of a communications manager that supports compression of group WUS in accordance with aspects of the present disclosure.

FIG. 12 shows a diagram 1200 of a communications manager 1205 that supports compression of group WUS in accordance with aspects of the present disclosure. The communications manager 1205 may be an example of aspects of a communications manager 1015, a communications manager 1115, or a communications manager 1310 described herein. The communications manager 1205 may include a WUS configuration manager 1210, a WUS manager 1215, a decoder 1220, a wake-up manager 1225, a wake-up behavior manager 1230, a CSI manager 1235, a BWP manager 1240, and a wake-up mask manager 1245. Each of these modules may communicate, directly or indirectly, with one another (e.g., via one or more buses).

The WUS configuration manager 1210 may identify a WUS configuration, where the WUS configuration includes a monitoring index associated with a WUS and an information format associated with the WUS. In some cases, the monitoring index associated with the WUS includes one or more indices, each index of the one or more indices corresponding to a cell configured for the UE. In some cases, one or both of a presence of behavior configuration information in the WUS and a location of behavior configuration information in the WUS is based on a value of a bit corresponding to the monitoring index. The WUS manager 1215 may receive the WUS. In some cases, the WUS manager 1215 may receive the WUS in DCI. In some cases, the WUS manager may receive an indication of the monitoring index via RRC signaling and monitor a location in DCI of the WUS based on the monitoring index. In some cases, the WUS manager 1215 may identify a wake-up indication based on monitoring the location.

The decoder 1220 may decode the received WUS based on the identified WUS configuration, where the WUS includes a wake-up indication and an indication of behavior configuration information. In some examples, the decoder 1220 may decode the identified one or more UE behavior configuration information fields. In some cases, the wake-up indication includes an indication for all UEs to wake-up. In some cases, the wake-up indication includes two or more bits corresponding to the monitoring index.

The wake-up manager 1225 may identify a wake-up group based on the wake-up indication. In some examples, the wake-up manager 1225 may determine whether the UE is part of a wake-up group associated with the wake-up signal based at least in part on decoding the received wake-up signal. In some examples, the wake-up manager 1225 may determine that no transmissions or receptions are to be scheduled based on a value of each of the two or more bits corresponding to the monitoring index. In some examples, the wake-up manager 1225 may determine to wake-up based on receiving the WUS. In some examples, the wake-up manager 1225 may determine whether the UE is part of the wake-up group based on the identified wake-up group. In some cases, one or more bits corresponding to the monitoring index associated with the WUS indicate behavior configuration information.

The wake-up behavior manager 1230 may identify one or more UE behavior configuration information fields of the WUS based on the identified wake-up group and the identified WUS configuration. In some examples, the wake-up behavior manager 1230 may identify one or more UE behavior configuration information fields of the WUS based on the monitoring index and a UE identifier. In some aspects, the UE identifier may include or may be an RNTI. In some examples, the wake-up behavior manager 1230 may identify one or both of a CSI report trigger and an indication of a BWP based on decoding the identified one or more UE behavior configuration information fields. In some examples, the wake-up behavior manager 1230 may identify behavior configuration information based on a value of the wake-up indication and a value of a bit corresponding to the monitoring index. In some examples, the wake-up behavior manager 1230 may identify behavior configuration information based on a value of each of the two or more bits corresponding to the monitoring index.

In some cases, a presence of the behavior configuration information in the WUS is based on the value of the wake-up indication and the value of the bit corresponding to the monitoring index. In some cases, a location of the indication of behavior configuration information is based on the value of the wake-up indication and the value of a bit corresponding to the monitoring index. In some cases, the behavior configuration information is identified based on one or more of RRC signaling, a default behavior configuration information, and a previous behavior configuration information from a last on-duration. In some cases, the indication of behavior configuration information includes the wake-up indication and a bit corresponding to the monitoring index.

The CSI manager 1235 may transmit a CSI report based on one or more of the CSI report trigger, a default CSI report, and RRC signaling. The BWP manager 1240 may activate the BWP based on one or more of the indication of the BWP, a last BWP used in a last on-duration, a default BWP, and a RRC configured BWP. The wake-up mask manager 1245 may identify a mask for comparison with the wake-up indication. In some examples, the wake-up mask manager 1245 may compare the identified mask with a bit sequence of the wake-up indication, where the identification of the wake-up group is based on the comparison. In some cases, the mask is identified based on one or both of RRC signaling and a UE identifier.

Figure 13:
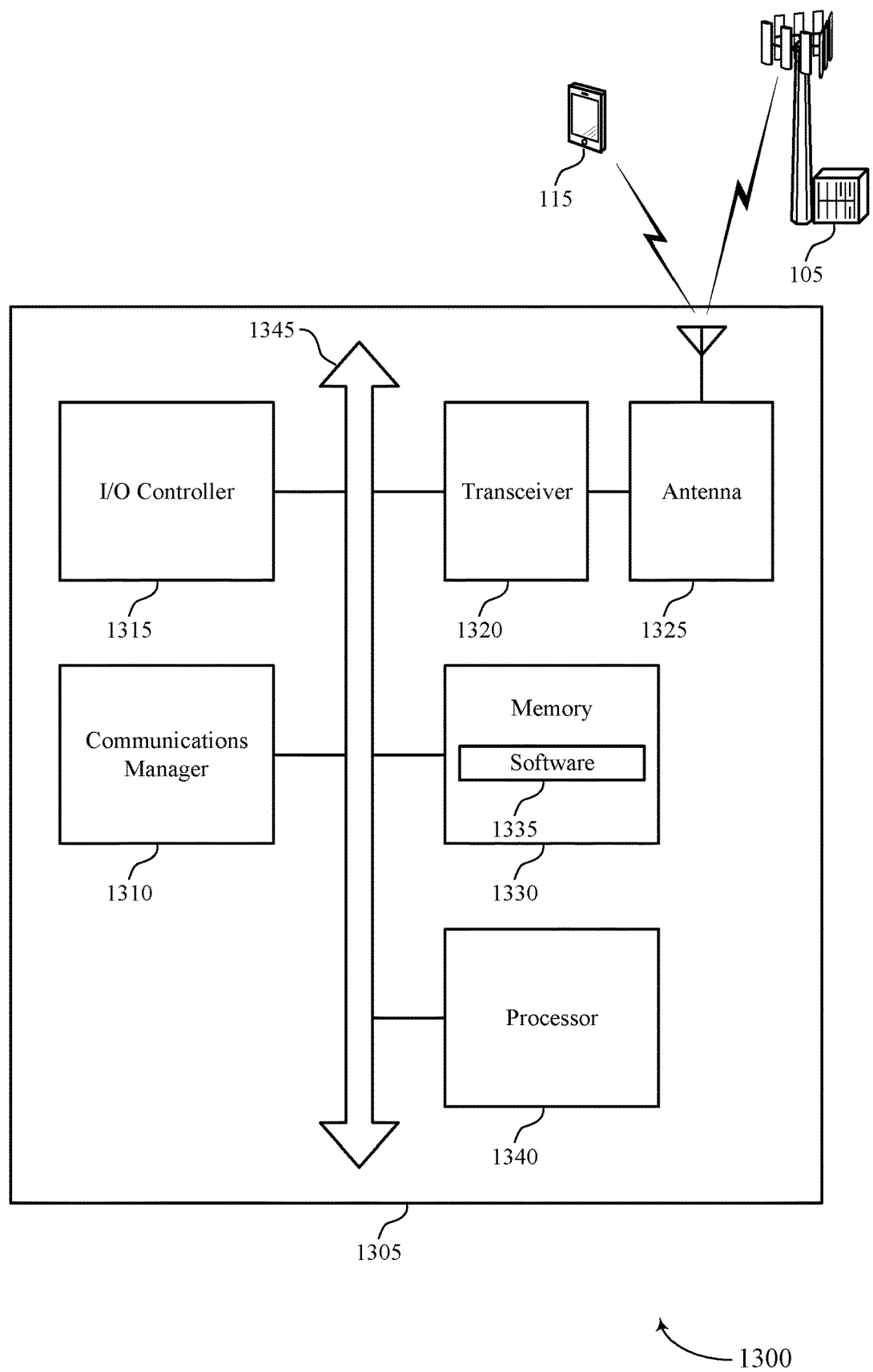
FIG. 13 shows a diagram of a system including a device that supports compression of group WUS in accordance with aspects of the present disclosure.

FIG. 13 shows a diagram of a system 1300 including a device 1305 that supports compression of group WUS in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a WUS configuration, where the WUS configuration includes at least a monitoring index associated with a WUS and an information format associated with the WUS, receive the WUS, decode the received WUS based on the identified WUS configuration, where the WUS includes a wake-up indication and an indication of behavior configuration information, and determine whether the UE is part of a wake-up group associated with the wake-up signal based at least in part on decoding the received wake-up signal.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code or software 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting compression of group WUS).

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
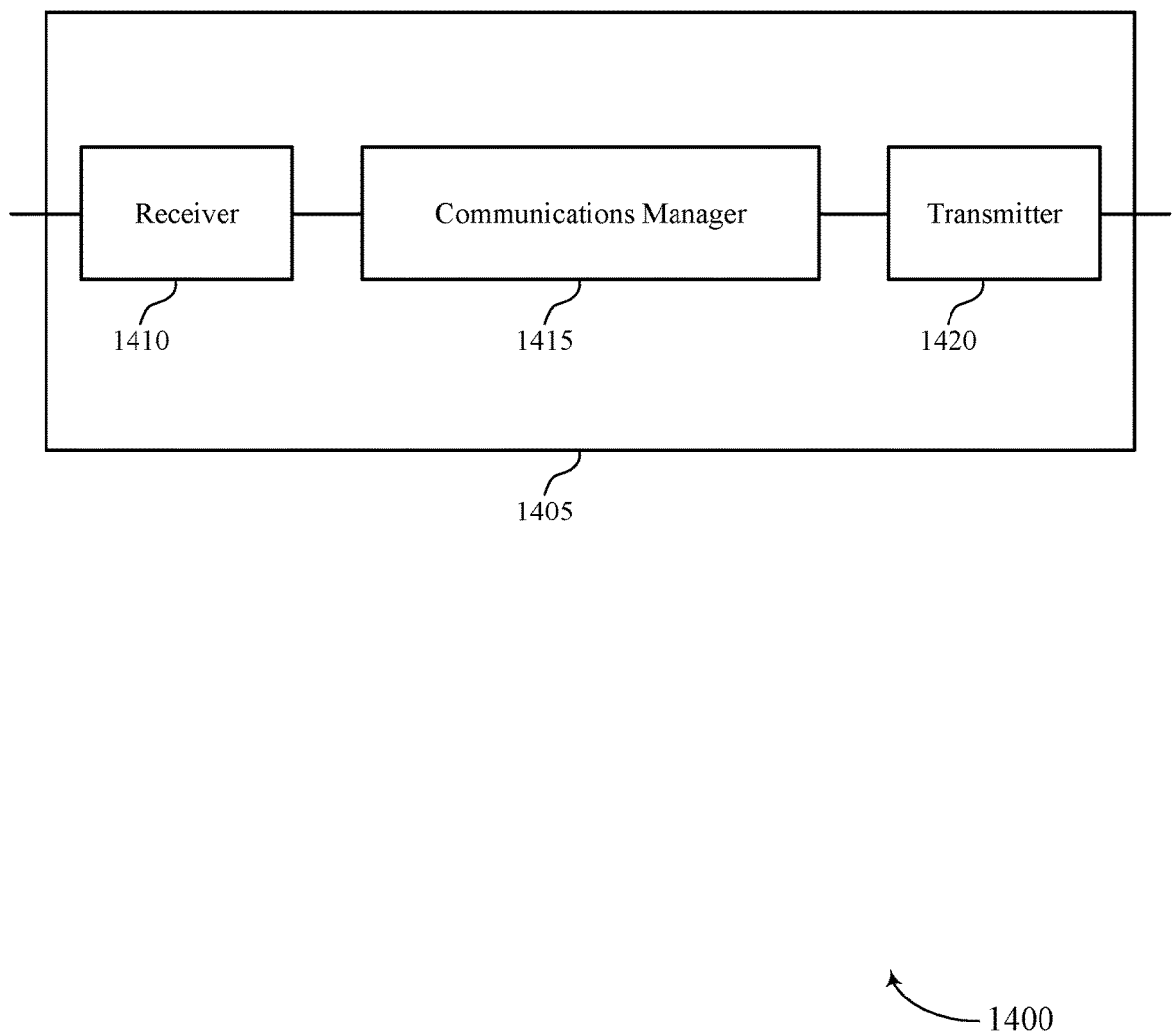
FIGS. 14 and 15 show diagrams of devices that support compression of group WUS in accordance with aspects of the present disclosure.

FIG. 14 shows a diagram 1400 of a device 1405 that supports compression of group WUS in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to compression of group WUS, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify a WUS configuration, where the WUS configuration includes a monitoring index associated with a WUS and an information format associated with the WUS, determine whether a UE is part of a wake-up group, determine a wake-up indication and an indication of behavior configuration information based on the determination of whether the UE is part of the wake-up group and the information format associated with the WUS, encode the WUS based on the identified WUS configuration, and transmit the encoded WUS, where the encoded WUS includes the determined wake-up indication and the determined indication of behavior configuration information. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

The communications manager 1415 as described herein may be implemented to realize one or more potential advantages. One implementation may enable the device 1405 to transmit a group-based WUS to signal a group of UEs to wake-up simultaneously, which may reduce the number of WUSs that the device 1405 may transmit to wake-up a number of UEs. Based on reducing the number of WUSs that the device 1405 transmits, the device 1405 may reduce the signaling overhead of a system and additionally may reduce interference levels in the system.

Further, based on reducing the number of WUSs, a processor or one or more processing units of the device 1405 may perform fewer processing operations associated with transmitting the WUSs. As such, the processing components of the device 1405 may be powered off or perform other processing operations, which may reduce the power costs of the device 1405 or increase the processing efficiency and capacity of the device 1405, or both.

Figure 15:
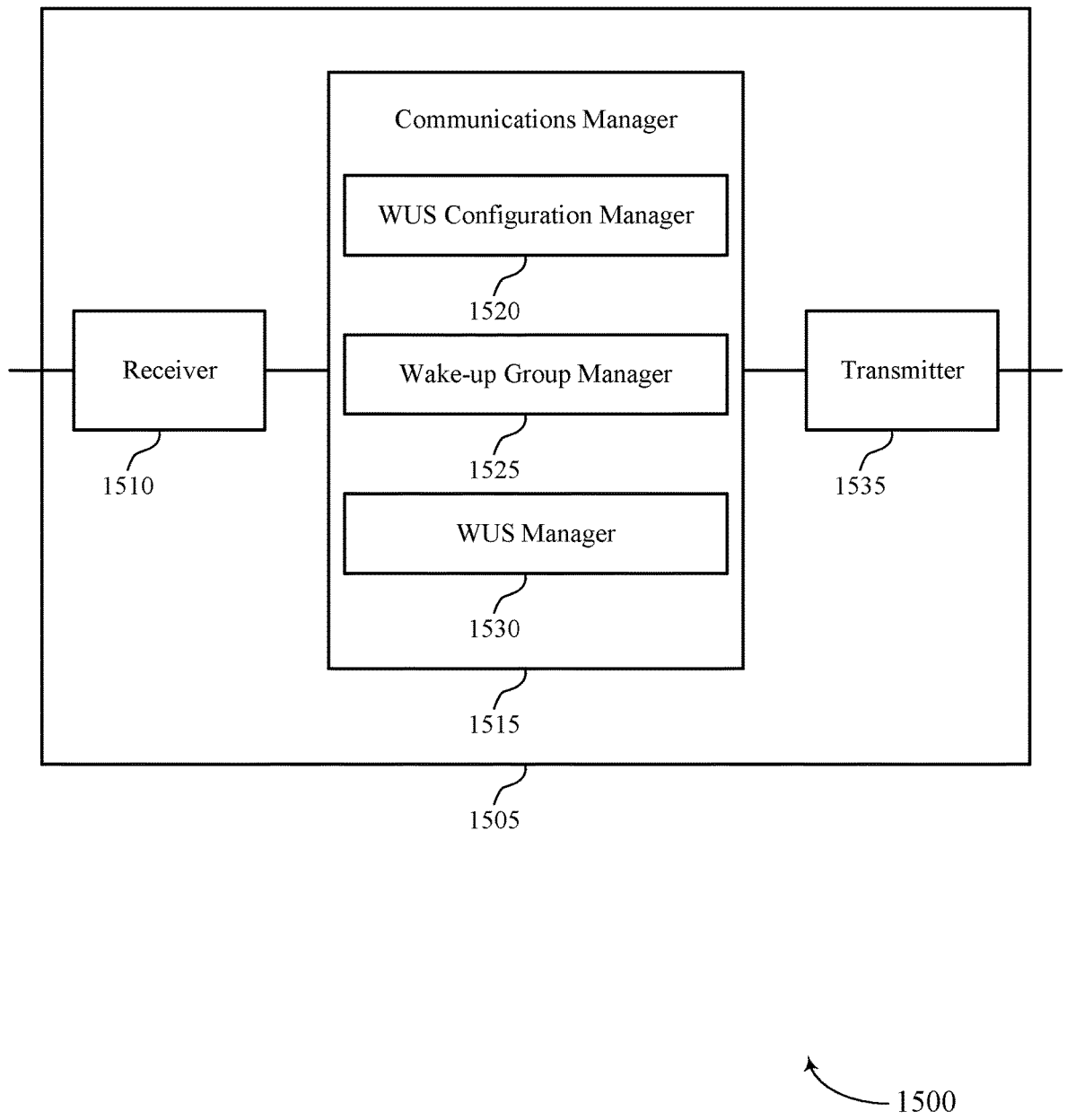

FIG. 15 shows a diagram 1500 of a device 1505 that supports compression of group WUS in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to compression of group WUS, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a WUS configuration manager 1520, a wake-up group manager 1525, and a WUS manager 1530. The communications manager 1515 may be an example of aspects of the communications manager 1710 described herein. The WUS configuration manager 1520 may identify a WUS configuration, where the WUS configuration includes a monitoring index associated with a WUS and an information format associated with the WUS. The wake-up group manager 1525 may determine whether a UE is part of a wake-up group. The WUS manager 1530 may determine a wake-up indication and an indication of behavior configuration information based on the determination of whether the UE is part of the wake-up group and the information format associated with the WUS, encode the WUS based on the identified WUS configuration, and transmit the encoded WUS, where the encoded WUS includes the determined wake-up indication and the determined indication of behavior configuration information.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
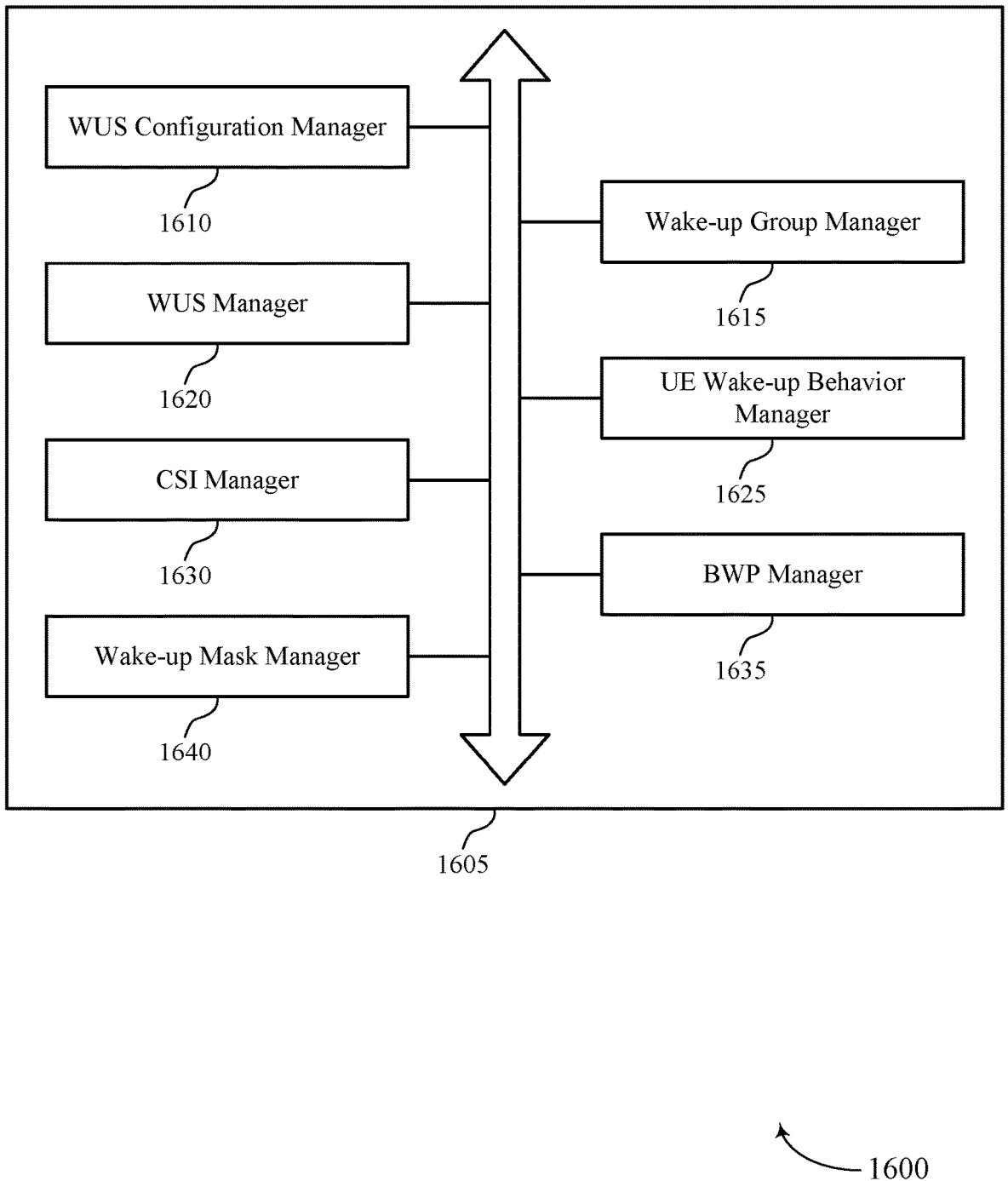
FIG. 16 shows a diagram of a communications manager that supports compression of group WUS in accordance with aspects of the present disclosure.

FIG. 16 shows a diagram 1600 of a communications manager 1605 that supports compression of group WUS in accordance with aspects of the present disclosure. The communications manager 1605 may be an example of aspects of a communications manager 1415, a communications manager 1515, or a communications manager 1710 described herein. The communications manager 1605 may include a WUS configuration manager 1610, a wake-up group manager 1615, a WUS manager 1620, an UE wake-up behavior manager 1625, a CSI manager 1630, a BWP manager 1635, and a wake-up mask manager 1640. Each of these modules may communicate, directly or indirectly, with one another (e.g., via one or more buses).

The WUS configuration manager 1610 may identify a WUS configuration, where the WUS configuration includes a monitoring index associated with a WUS and an information format associated with the WUS. The wake-up group manager 1615 may determine whether a UE is part of a wake-up group. In some examples, the wake-up group manager 1615 may determine one or more UEs that are part of the wake-up group.

The WUS manager 1620 may determine a wake-up indication and an indication of behavior configuration information based on the determination of whether the UE is part of the wake-up group and the information format associated with the WUS. In some examples, the WUS manager 1620 may encode the WUS based on the identified WUS configuration. In some examples, transmitting the encoded WUS, where the encoded WUS includes the determined wake-up indication and the determined indication of behavior configuration information. In some cases, the wake-up indication includes an indication for all UEs to wake-up. In some cases, the indication of behavior configuration information is based on a value of the wake-up indication and a value of a bit corresponding to the monitoring index. In some cases, the WUS manager 1620 may determine a group of wake-up indications for a set of UEs, and determine a group of indications of behavior configuration information for the set of UEs, where the WUS is encoded based at least in part on the group of wake-up indications preceding the group of indications of behavior configuration information.

In some cases, a presence of the behavior configuration information in the WUS is based on the value of the wake-up indication and the value of the bit corresponding to the monitoring index. In some cases, a location of the indication of behavior configuration information is based on the value of the wake-up indication and the value of a bit corresponding to the monitoring index. In some cases, the indication of behavior configuration information is identified based on one or more of RRC signaling, a default behavior configuration information, and a previous behavior configuration information from a last on-duration. In some cases, the indication of behavior configuration information includes the wake-up indication and a bit corresponding to the monitoring index. In some cases, the wake-up indication includes two or more bits corresponding to the monitoring index. In some cases, the monitoring index associated with the WUS includes one or more indices, each index of the one or more indices corresponding to a cell configured for the UE. In some cases, one or both of a presence of behavior configuration information in the WUS and a location of behavior configuration information in the WUS is based on a value of a bit corresponding to the monitoring index.

The UE wake-up behavior manager 1625 may identify one or both of a CSI report trigger and an indication of a BWP, where the indication of behavior configuration information is determined based on the identification of one or both of the CSI report trigger and the indication of the BWP. The CSI manager 1630 may receive a CSI report based on one or both of the CSI report trigger and a default CSI report. In some examples, the CSI manager 1630 may transmit RRC signaling configuring a type of CSI report. In some examples, the CSI manager 1630 may receive a CSI report based on one or both of the CSI report trigger and the type of CSI report.

The BWP manager 1635 may transmit the BWP based on one or more of the indication of the BWP, a last BWP used in a last on-duration, and a default BWP. In some examples, the BWP manager 1635 may transmit RRC signaling configuring the BWP. In some examples, the BWP manager 1635 may transmit the BWP based on one or both of the indication of the BWP and the configured BWP.

The wake-up mask manager 1640 may identify a UE mask, for UE comparison with the wake-up indication, of each of the determined one or more UEs that are part of the wake-up group. In some examples, the wake-up mask manager 1640 may determine a bit sequence of the wake-up indication based on the identified UE mask of each of the determined one or more UEs that are part of the wake-up group. In some cases, the UE mask of each of the determined one or more UEs is identified based on one or both of RRC signaling and a UE identifier.

Figure 17:
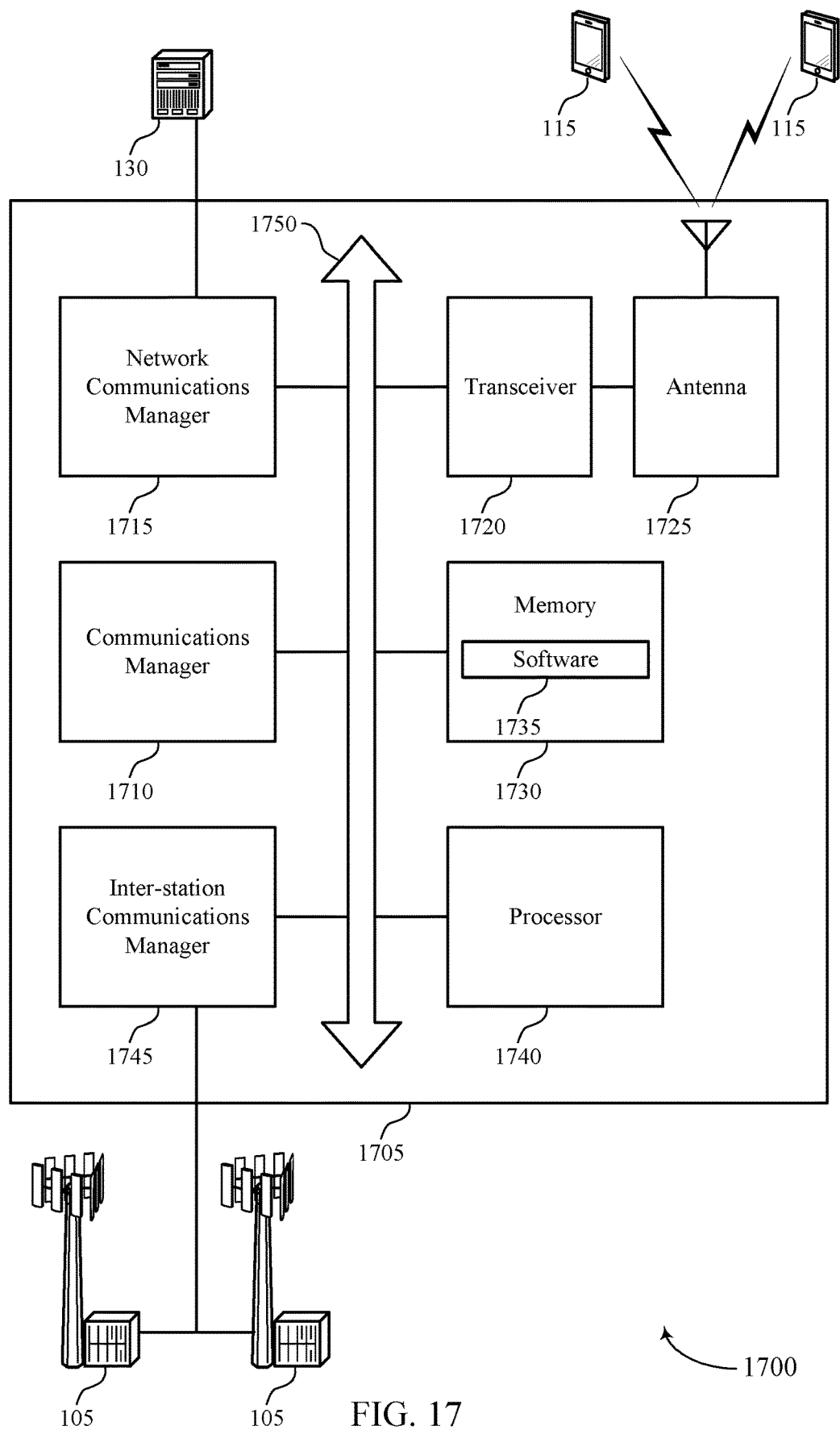
FIG. 17 shows a diagram of a system including a device that supports compression of group WUS in accordance with aspects of the present disclosure.

FIG. 17 shows a diagram of a system 1700 including a device 1705 that supports compression of group WUS in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may identify a WUS configuration, where the WUS configuration includes a monitoring index associated with a WUS and an information format associated with the WUS, determine whether a UE is part of a wake-up group, determine a wake-up indication and an indication of behavior configuration information based on the determination of whether the UE is part of the wake-up group and the information format associated with the WUS, encode the WUS based on the identified WUS configuration, and transmit the encoded WUS, where the encoded WUS includes the determined wake-up indication and the determined indication of behavior configuration information.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code or software 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting compression of group WUS).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The software 1735 may include instructions to implement aspects of the present disclosure, including instructions to support wireless communications. The software 1735 may be stored in a non-transitory computer-readable medium such as system memory or other type of memory. In some cases, the software 1735 may not be directly executable by the processor 1740 but may cause a computer (e.g., when compiled and executed) to perform functions described herein.

Figure 18:
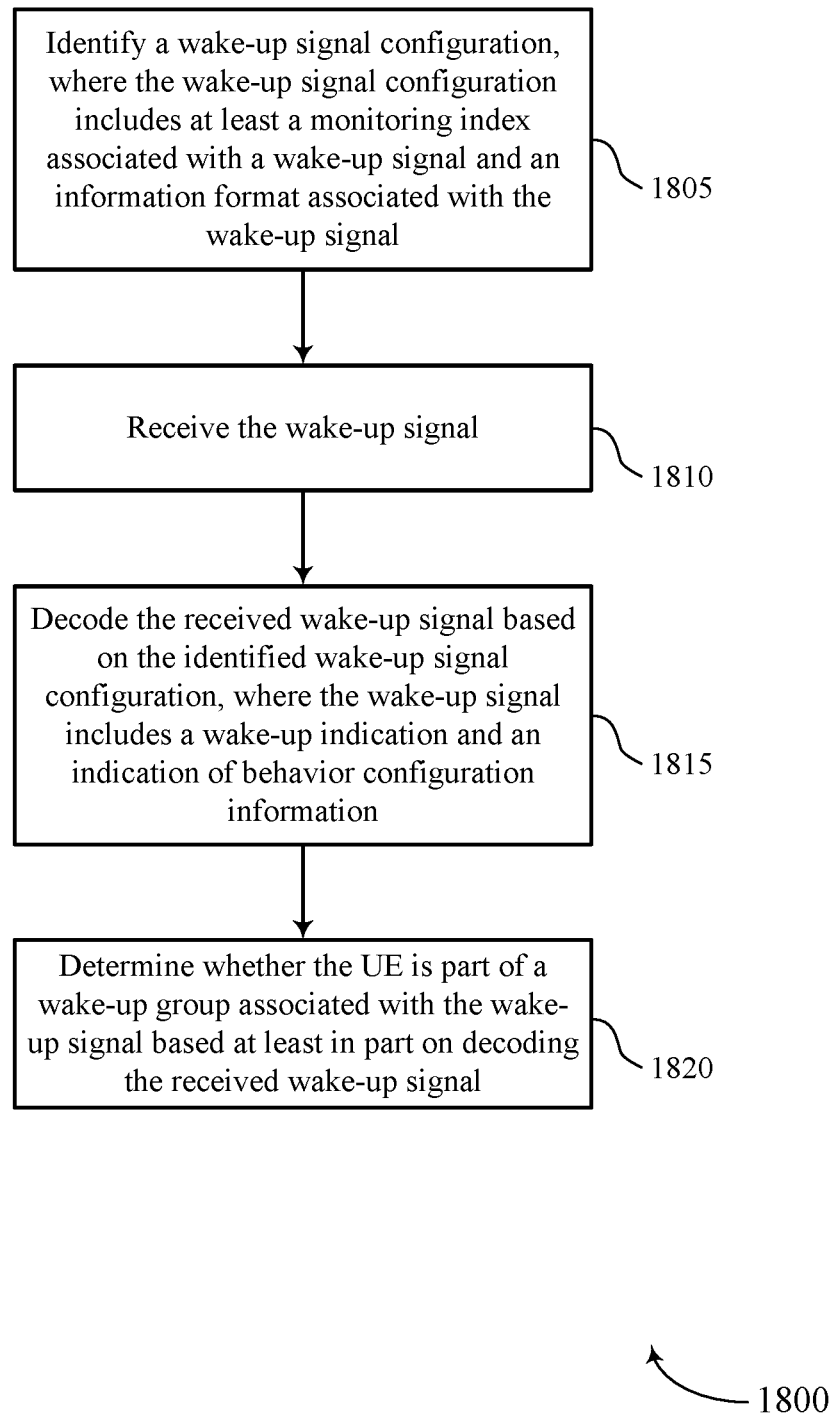
FIGS. 18 through 22 show flowcharts illustrating methods that support compression of group WUS in accordance with aspects of the present disclosure.

FIG. 18 shows a flowchart illustrating a method 1800 that supports compression of group WUS in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may identify a WUS configuration, where the WUS configuration includes at least a monitoring index associated with a WUS and an information format associated with the WUS. The operations of 1805 may be performed according to the methods described herein. In some examples, aspects of the operations of 1805 may be performed by a WUS configuration manager as described with reference to FIGS. 10 through 13.

At 1810, the UE may receive the WUS. The operations of 1810 may be performed according to the methods described herein. In some examples, aspects of the operations of 1810 may be performed by a WUS manager as described with reference to FIGS. 10 through 13.

At 1815, the UE may decode the received WUS based on the identified WUS configuration, where the WUS includes a wake-up indication and an indication of behavior configuration information. The operations of 1815 may be performed according to the methods described herein. In some examples, aspects of the operations of 1815 may be performed by a decoder as described with reference to FIGS. 10 through 13.

At 1820, the UE may determine whether the UE is part of a wake-up group associated with the wake-up signal based at least in part on decoding the received wake-up signal. The operations of 1820 may be performed according to the methods described herein. In some examples, aspects of the operations of 1820 may be performed by a wake-up manager as described with reference to FIGS. 10 through 13.

Figure 19:
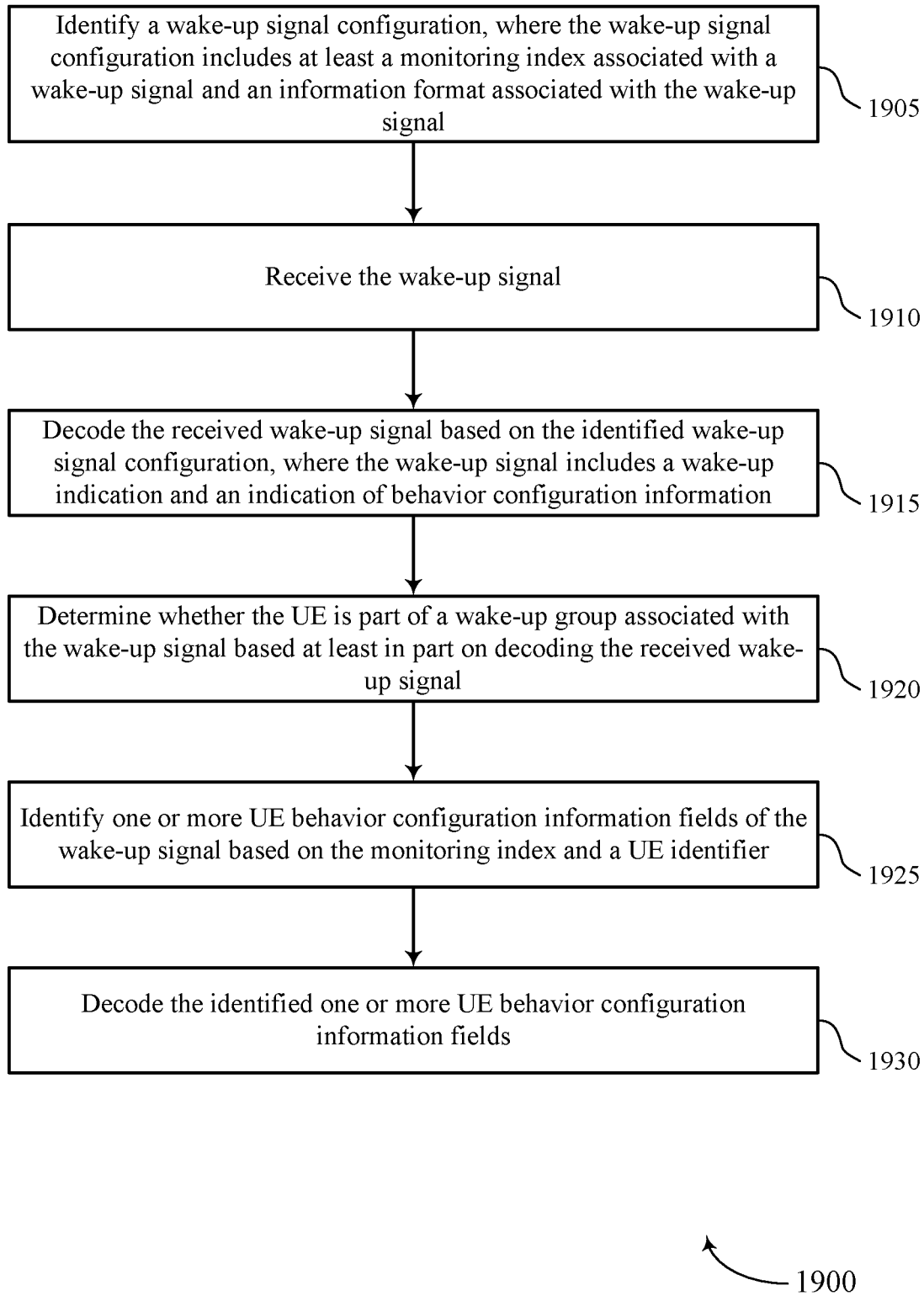

FIG. 19 shows a flowchart illustrating a method 1900 that supports compression of group WUS in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1905, the UE may identify a WUS configuration, where the WUS configuration includes at least a monitoring index associated with a WUS and an information format associated with the WUS. The operations of 1905 may be performed according to the methods described herein. In some examples, aspects of the operations of 1905 may be performed by a WUS configuration manager as described with reference to FIGS. 10 through 13.

At 1910, the UE may receive the WUS. The operations of 1910 may be performed according to the methods described herein. In some examples, aspects of the operations of 1910 may be performed by a WUS manager as described with reference to FIGS. 10 through 13.

At 1915, the UE may decode the received WUS based on the identified WUS configuration, where the WUS includes a wake-up indication and an indication of behavior configuration information. The operations of 1915 may be performed according to the methods described herein. In some examples, aspects of the operations of 1915 may be performed by a decoder as described with reference to FIGS. 10 through 13.

At 1920, the UE may determine whether the UE is part of a wake-up group associated with the wake-up signal based at least in part on decoding the received wake-up signal. The operations of 1920 may be performed according to the methods described herein. In some examples, aspects of the operations of 1920 may be performed by a wake-up manager as described with reference to FIGS. 10 through 13.

At 1925, the UE may identify one or more UE behavior configuration information fields of the WUS based on the monitoring occasion and a UE identifier. The operations of 1925 may be performed according to the methods described herein. In some examples, aspects of the operations of 1925 may be performed by a wake-up behavior manager as described with reference to FIGS. 10 through 13.

At 1930, the UE may decode the identified one or more UE behavior configuration information fields. The operations of 1930 may be performed according to the methods described herein. In some examples, aspects of the operations of 1930 may be performed by a decoder as described with reference to FIGS. 10 through 13.

Figure 20:
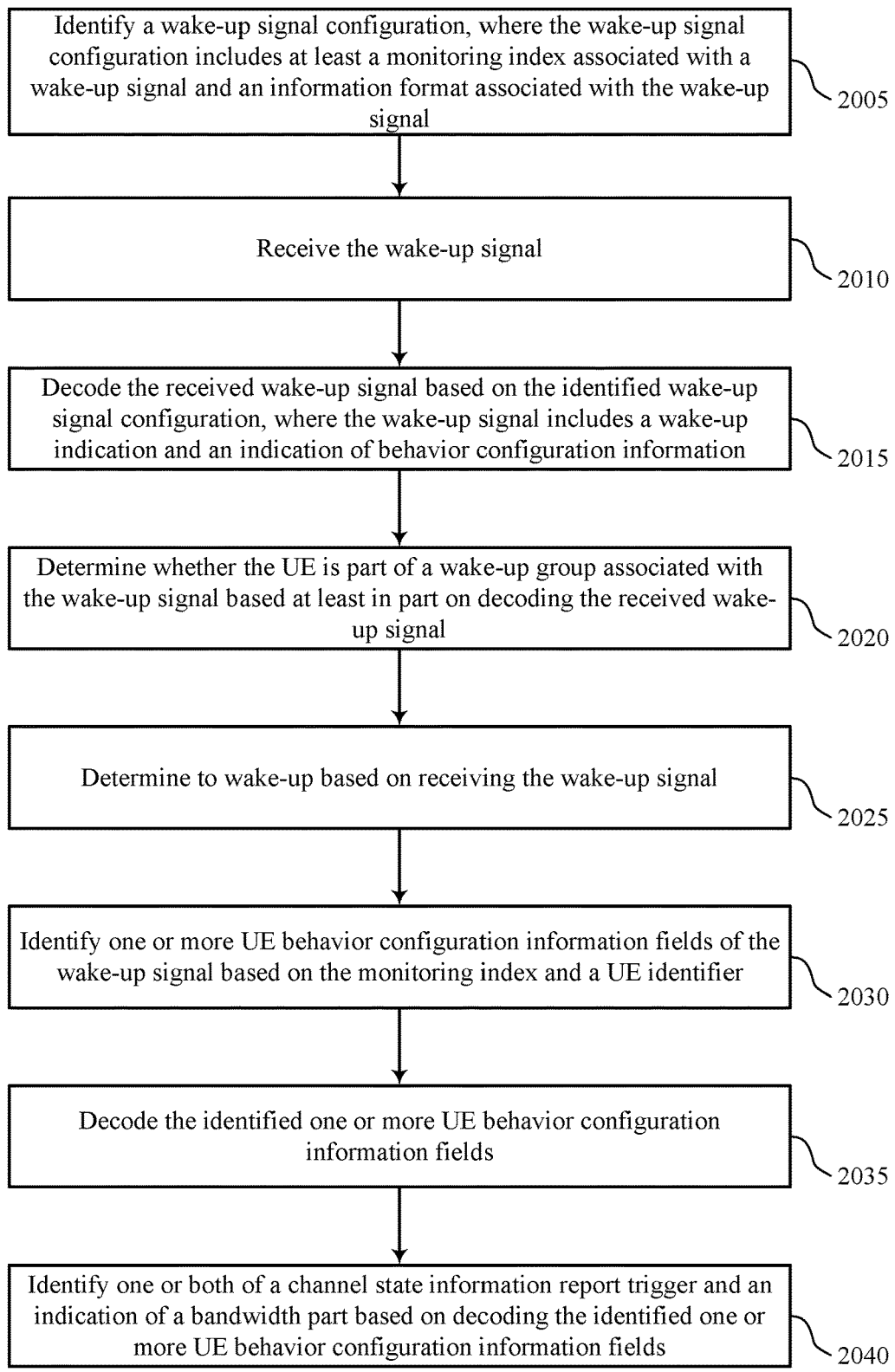

FIG. 20 shows a flowchart illustrating a method 2000 that supports compression of group WUS in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2005, the UE may identify a WUS configuration, where the WUS configuration includes at least a monitoring index associated with a WUS and an information format associated with the WUS. The operations of 2005 may be performed according to the methods described herein. In some examples, aspects of the operations of 2005 may be performed by a WUS configuration manager as described with reference to FIGS. 10 through 13.

At 2010, the UE may receive the WUS. The operations of 2010 may be performed according to the methods described herein. In some examples, aspects of the operations of 2010 may be performed by a WUS manager as described with reference to FIGS. 10 through 13.

At 2015, the UE may decode the received WUS based on the identified WUS configuration, where the WUS includes a wake-up indication and an indication of behavior configuration information. The operations of 2015 may be performed according to the methods described herein. In some examples, aspects of the operations of 2015 may be performed by a decoder as described with reference to FIGS. 10 through 13.

At 2020, the UE may determine whether the UE is part of a wake-up group associated with the wake-up signal based at least in part on decoding the received wake-up signal. The operations of 2020 may be performed according to the methods described herein. In some examples, aspects of the operations of 2020 may be performed by a wake-up manager as described with reference to FIGS. 10 through 13.

At 2025, the UE may determine to wake-up based on receiving the WUS (e.g., based on the UE determining that the UE is a part of the wake-up group, that the WUS indicates the UE or a group the UE belongs to is to wake-up, etc.). The operations of 2025 may be performed according to the methods described herein. In some examples, aspects of the operations of 2025 may be performed by a wake-up manager as described with reference to FIGS. 10 through 13.

At 2030, the UE may identify one or more UE behavior configuration information fields of the WUS based on the monitoring index and a UE identifier. The operations of 2030 may be performed according to the methods described herein. In some examples, aspects of the operations of 2030 may be performed by a wake-up behavior manager as described with reference to FIGS. 10 through 13.

At 2035, the UE may decode the identified one or more UE behavior configuration information fields. The operations of 2035 may be performed according to the methods described herein. In some examples, aspects of the operations of 2035 may be performed by a decoder as described with reference to FIGS. 10 through 13.

At 2040, the UE may identify one or both of a CSI report trigger and an indication of a BWP based on decoding the identified one or more UE behavior configuration information fields. The operations of 2040 may be performed according to the methods described herein. In some examples, aspects of the operations of 2040 may be performed by a wake-up behavior manager as described with reference to FIGS. 10 through 13.

Figure 21:
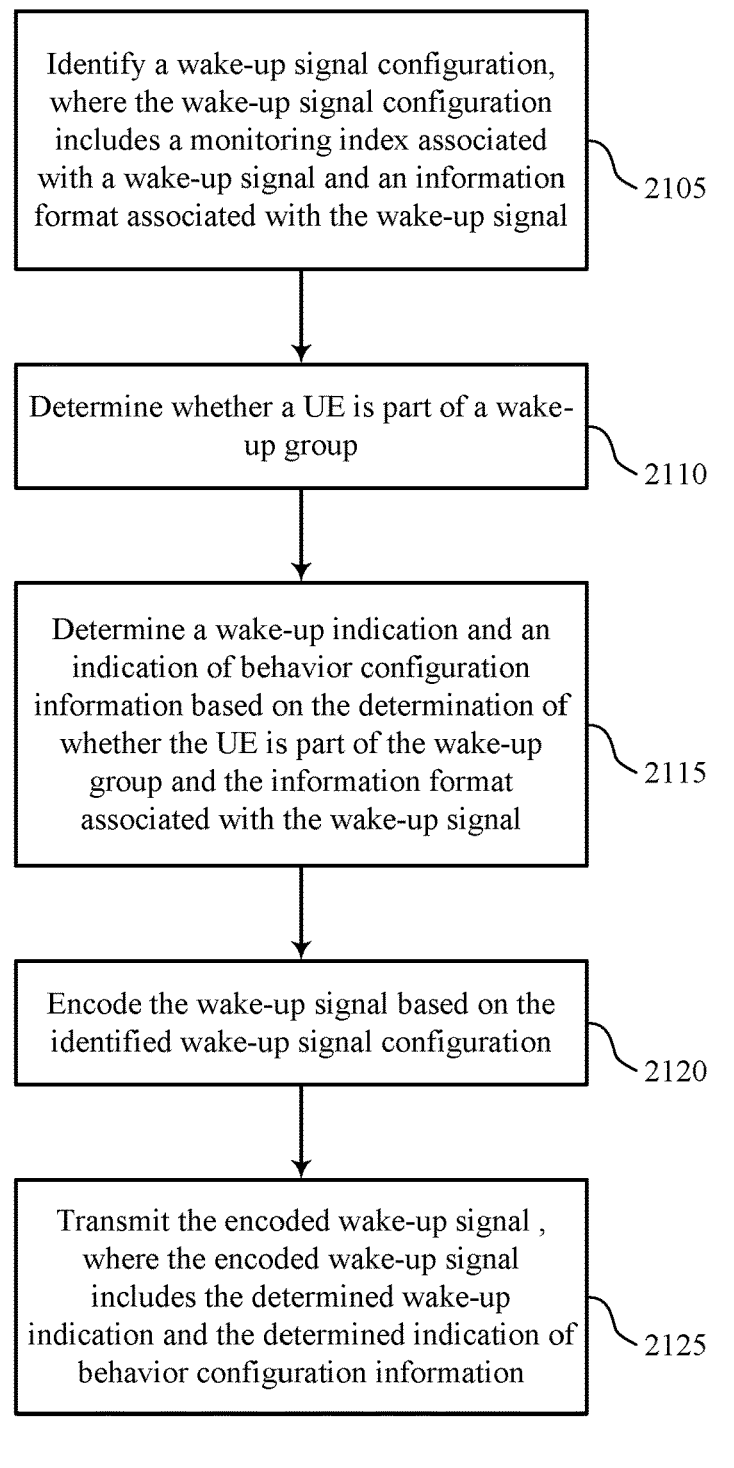

FIG. 21 shows a flowchart illustrating a method 2100 that supports compression of group WUS in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2105, the base station may identify a WUS configuration, where the WUS configuration includes a monitoring index associated with a WUS and an information format associated with the WUS. The operations of 2105 may be performed according to the methods described herein. In some examples, aspects of the operations of 2105 may be performed by a WUS configuration manager as described with reference to FIGS. 14 through 17.

At 2110, the base station may determine whether a UE is part of a wake-up group. The operations of 2110 may be performed according to the methods described herein. In some examples, aspects of the operations of 2110 may be performed by a wake-up group manager as described with reference to FIGS. 14 through 17.

At 2115, the base station may determine a wake-up indication and an indication of behavior configuration information based on the determination of whether the UE is part of the wake-up group and the information format associated with the WUS. The operations of 2115 may be performed according to the methods described herein. In some examples, aspects of the operations of 2115 may be performed by a WUS manager as described with reference to FIGS. 14 through 17.

At 2120, the base station may encode the WUS based on the identified WUS configuration. The operations of 2120 may be performed according to the methods described herein. In some examples, aspects of the operations of 2120 may be performed by a WUS manager as described with reference to FIGS. 14 through 17.

At 2125, the base station may transmit the encoded WUS, where the encoded WUS includes the determined wake-up indication and the determined indication of behavior configuration information. The operations of 2125 may be performed according to the methods described herein. In some examples, aspects of the operations of 2125 may be performed by a WUS manager as described with reference to FIGS. 14 through 17.

Figure 22:
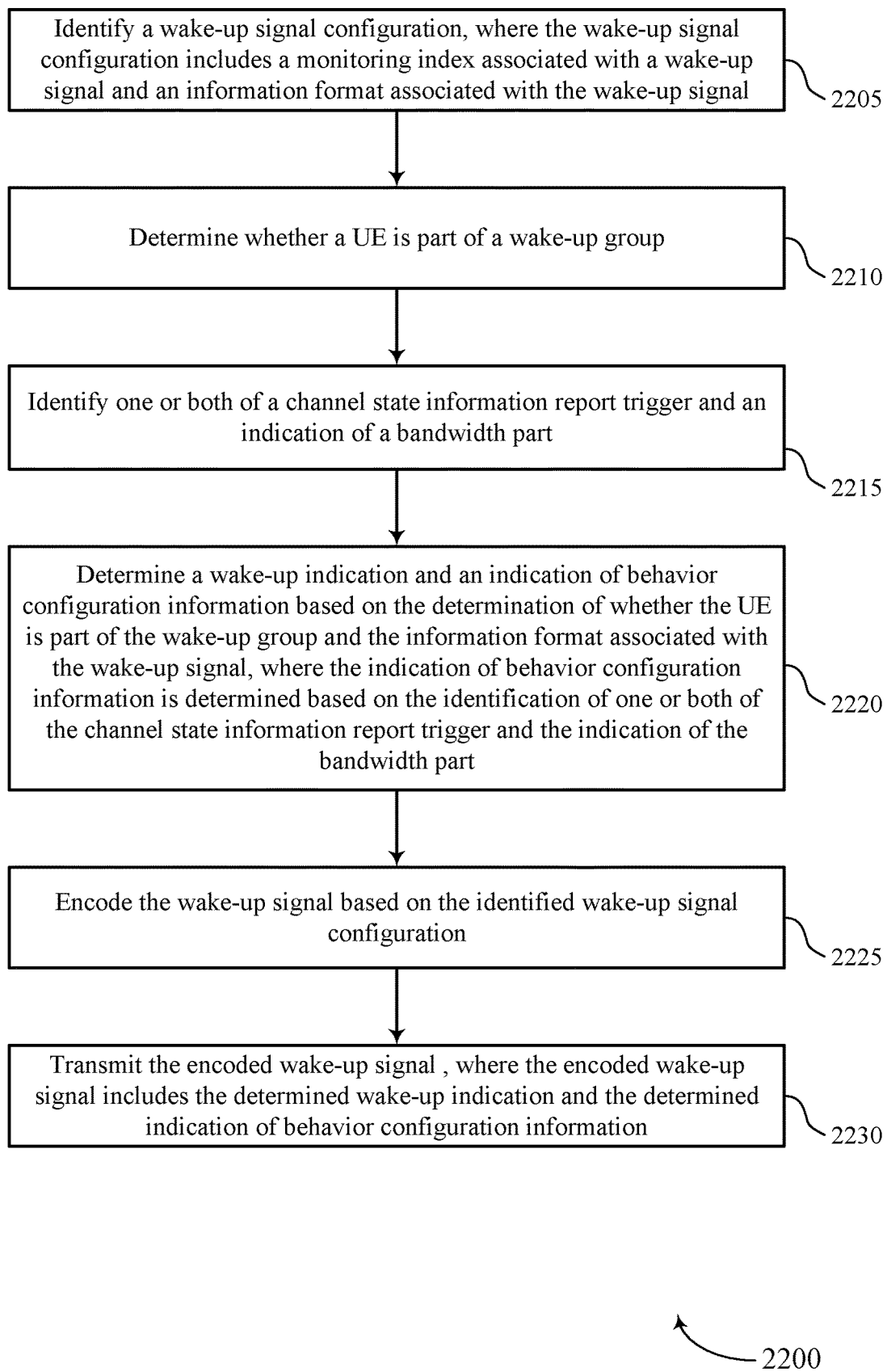

FIG. 22 shows a flowchart illustrating a method 2200 that supports compression of group WUS in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2205, the base station may identify a WUS configuration, where the WUS configuration includes a monitoring index associated with a WUS and an information format associated with the WUS. The operations of 2205 may be performed according to the methods described herein. In some examples, aspects of the operations of 2205 may be performed by a WUS configuration manager as described with reference to FIGS. 14 through 17.

At 2210, the base station may determine whether a UE is part of a wake-up group. The operations of 2210 may be performed according to the methods described herein. In some examples, aspects of the operations of 2210 may be performed by a wake-up group manager as described with reference to FIGS. 14 through 17.

At 2215, the base station may identify one or both of a CSI report trigger and an indication of a BWP. The operations of 2215 may be performed according to the methods described herein. In some examples, aspects of the operations of 2215 may be performed by an UE wake-up behavior manager as described with reference to FIGS. 14 through 17.

At 2220, the base station may determine a wake-up indication and an indication of behavior configuration information based on the determination of whether the UE is part of the wake-up group and the information format associated with the WUS, where the indication of behavior configuration information is determined based on the identification of one or both of the CSI report trigger and the indication of the BWP. The operations of 2220 may be performed according to the methods described herein. In some examples, aspects of the operations of 2220 may be performed by a WUS manager as described with reference to FIGS. 14 through 17.

At 2225, the base station may encode the WUS based on the identified WUS configuration (e.g., and based on the WUS monitoring index of the UE that is part of the wake-up group, the identified CSI report trigger information, the identified BWP information, etc.). The operations of 2225 may be performed according to the methods described herein. In some examples, aspects of the operations of 2225 may be performed by a WUS manager as described with reference to FIGS. 14 through 17.

At 2230, the base station may transmit the encoded WUS, where the encoded WUS includes the determined wake-up indication and the determined indication of behavior configuration information. The operations of 2230 may be performed according to the methods described herein. In some examples, aspects of the operations of 2230 may be performed by a WUS manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying a wake-up signal configuration, wherein the wake-up signal configuration comprises at least a monitoring index for the UE associated with a wake-up signal and an information format associated with the wake-up signal;
receiving the wake-up signal;
decoding the received wake-up signal based at least in part on the identified wake-up signal configuration, wherein the wake-up signal comprises a wake-up indication and a plurality of UE behavior configuration information fields indicating a channel state information report trigger corresponding to a plurality of UEs of a wake-up group; and
determining to wake up the UE based at least in part on decoding the received wake-up signal and performing behavior in accordance with behavior configuration information for the UE included in a first set of UE behavior configuration information fields of the plurality of UE behavior configuration information fields corresponding to the monitoring index for the UE, wherein a second set of UE behavior configuration information fields of the plurality of UE behavior configuration information fields corresponds to different UEs associated with the wake-up signal, the second set of UE behavior configuration information fields being distinct from the first set.

2. The method of claim 1, further comprising:
identifying the first set of UE behavior configuration information fields of the plurality of UE behavior configuration information fields based at least in part on the monitoring index and a UE identifier; and
decoding the identified first set of UE behavior configuration information fields.

3. The method of claim 2, wherein the UE identifier comprises a radio network temporary identifier.

4. The method of claim 2, further comprising:
identifying one or both of the channel state information report trigger and an indication of a bandwidth part based at least in part on decoding the identified first set of UE behavior configuration information fields.

5. The method of claim 4, further comprising:
transmitting a channel state information report based at least in part on one or more of the channel state information report trigger, a default channel state information report, and radio resource control signaling.

6. The method of claim 4, further comprising:
activating the bandwidth part based at least in part on one or more of the indication of the bandwidth part, a last bandwidth part used in a last on-duration, a default bandwidth part, and a radio resource control configured bandwidth part.

7. The method of claim 1, further comprising:
receiving the wake-up signal in downlink control information.

8. The method of claim 1, further comprising:
receiving an indication of the monitoring index via radio resource control signaling; and
monitoring a location in downlink control information corresponding to the wake-up signal based at least in part on the monitoring index, wherein the location further corresponds to the first set of UE behavior configuration information fields corresponding to the monitoring index for the UE.

9. The method of claim 8, further comprising:
identifying the wake-up indication based at least in part on monitoring the location.

10. The method of claim 1, wherein one or more bits corresponding to the monitoring index associated with the wake-up signal indicate the behavior configuration information for the UE.

11. The method of claim 1, wherein one or both of a presence of the behavior configuration information for the UE in the wake-up signal and a location of the behavior configuration information for the UE in the wake-up signal is based at least in part on a value of a bit corresponding to the monitoring index.

12. A method for wireless communication at a network device, comprising:
identifying a wake-up signal configuration, wherein the wake-up signal configuration comprises a monitoring index for a user equipment (UE) associated with a wake-up signal and an information format associated with the wake-up signal;
determining whether the UE is part of a wake-up group;
determining a wake-up indication and an indication of behavior configuration information for the UE based at least in part on the determination of whether the UE is part of the wake-up group and the information format associated with the wake-up signal;
encoding the wake-up signal based at least in part on the identified wake-up signal configuration; and
transmitting the encoded wake-up signal, wherein the encoded wake-up signal comprises the determined wake-up indication, a plurality of UE behavior configuration information fields indicating a channel state information report trigger corresponding to a plurality of UEs of the wake-up group, and the determined indication of the behavior configuration information for the UE in a first set of UE behavior configuration information fields of the plurality of UE behavior configuration information fields corresponding to the monitoring index for the UE, wherein a second set of UE behavior configuration information fields of the plurality of UE behavior configuration information fields corresponds to different UEs associated with the wake-up signal, the second set of UE behavior configuration information fields being distinct from the first set.

13. The method of claim 12, further comprising:
identifying one or both of the channel state information report trigger and an indication of a bandwidth part, wherein the indication of the behavior configuration information for the UE is determined based at least in part on the identifying the one or both of the channel state information report trigger and the indication of the bandwidth part.

14. The method of claim 13, further comprising:
receiving a channel state information report based at least in part on one or both of the channel state information report trigger and a default channel state information report.

15. The method of claim 13, further comprising:
transmitting radio resource control signaling configuring a type of channel state information report; and
receiving a channel state information report based at least in part on one or both of the channel state information report trigger and the type of channel state information report.

16. The method of claim 13, further comprising:
communicating in the bandwidth part based at least in part on one or more of the indication of the bandwidth part, a last bandwidth part used in a last on-duration, and a default bandwidth part.

17. The method of claim 13, further comprising:
transmitting radio resource control signaling configuring the bandwidth part; and
communicating in the bandwidth part based at least in part on one or both of the indication of the bandwidth part and the configured bandwidth part.

18. The method of claim 12, wherein one or both of a presence of the behavior configuration information for the UE in the wake-up signal and a location of the behavior configuration information for the UE in the wake-up signal is based at least in part on a value of a bit corresponding to the monitoring index.

19. The method of claim 12, further comprising:
determining a group of wake-up indications for the plurality of UEs; and
determining a group of indications of behavior configuration information for the plurality of UEs, wherein the wake-up signal is encoded based at least in part on the group of wake-up indications preceding the group of indications of behavior configuration information.

20. The method of claim 12, further comprising:
transmitting the encoded wake-up signal in downlink control information.

21. An apparatus for wireless communication at a user equipment (UE), comprising:
a processor,
memory coupled with the processor; and
instructions stored in the memory and executable by the processor to cause the apparatus to:
identify a wake-up signal configuration, wherein the wake-up signal configuration comprises at least a monitoring index for the UE associated with a wake-up signal and an information format associated with the wake-up signal;
receive the wake-up signal;
decode the received wake-up signal based at least in part on the identified wake-up signal configuration, wherein the wake-up signal comprises a wake-up indication and a plurality of UE behavior configuration information fields indicating a a channel state information report trigger corresponding to a plurality of UEs of a wake-up group; and
determine to wake up the UE based at least in part on decoding the received wake-up signal and perform behavior in accordance with behavior configuration information for the UE included in a first set of UE behavior configuration information fields of the plurality of UE behavior configuration information fields corresponding to the monitoring index for the UE, wherein a second set of UE behavior configuration information fields of the plurality of UE behavior configuration information fields corresponds to different UEs associated with the wake-up signal, the second set of UE behavior configuration information fields being distinct from the first set.

22. The apparatus of claim 21, wherein the instructions are further executable by the processor to cause the apparatus to:
identify the first set of UE behavior configuration information fields of the plurality of UE behavior configuration information fields based at least in part on the monitoring index and a UE identifier; and
decode the identified first set of UE behavior configuration information fields.

23. The apparatus of claim 22, wherein the instructions are further executable by the processor to cause the apparatus to:
identify one or both of the channel state information report trigger and an indication of a bandwidth part based at least in part on decoding the identified first set of UE behavior configuration information fields.

24. The apparatus of claim 23, wherein the instructions are further executable by the processor to cause the apparatus to:
transmit a channel state information report based at least in part on one or more of the channel state information report trigger, a default channel state information report, and radio resource control signaling.

25. The apparatus of claim 23, wherein the instructions are further executable by the processor to cause the apparatus to:
activate the bandwidth part based at least in part on one or more of the indication of the bandwidth part, a last bandwidth part used in a last on-duration, a default bandwidth part, and a radio resource control configured bandwidth part.

26. An apparatus for wireless communication at a network device, comprising:
a processor,
memory coupled with the processor; and
instructions stored in the memory and executable by the processor to cause the apparatus to:
identify a wake-up signal configuration, wherein the wake-up signal configuration comprises a monitoring index for a user equipment (UE) associated with a wake-up signal and an information format associated with the wake-up signal;
determine whether the UE is part of a wake-up group;
determine a wake-up indication and an indication of behavior configuration information for the UE based at least in part on the determination of whether the UE is part of the wake-up group and the information format associated with the wake-up signal;
encode the wake-up signal based at least in part on the identified wake-up signal configuration; and
transmit the encoded wake-up signal, wherein the encoded wake-up signal comprises the determined wake-up indication, a plurality of UE behavior configuration information fields indicating a channel state information report trigger corresponding to a plurality of UEs of the wake-up group, and the determined indication of the behavior configuration information for the UE in a first set of UE behavior configuration information fields of the plurality of UE behavior configuration information fields corresponding to the monitoring index for the UE, wherein a second set of UE behavior configuration information fields of the plurality of UE behavior configuration information fields corresponds to different UEs associated with the wake-up signal, the second set of UE behavior configuration information fields being distinct from the first set.

27. The apparatus of claim 26, wherein the instructions are further executable by the processor to cause the apparatus to:
identify one or both of the channel state information report trigger and an indication of a bandwidth part, wherein the indication of the behavior configuration information for the UE is determined based at least in part on the identifying the one or both of the channel state information report trigger and the indication of the bandwidth part.

28. The apparatus of claim 27, wherein the instructions are further executable by the processor to cause the apparatus to:
receive a channel state information report based at least in part on one or both of the channel state information report trigger and a default channel state information report.

29. The apparatus of claim 27, wherein the instructions are further executable by the processor to cause the apparatus to:
transmit radio resource control signaling configuring a type of channel state information report; and
receive a channel state information report based at least in part on one or both of the channel state information report trigger and the type of channel state information report.

* * * * *